US012671479B2

(12) United States Patent
Zou et al.

(10) Patent No.: US 12,671,479 B2
(45) Date of Patent: Jun. 30, 2026

(54) DATA TRANSMISSION METHOD AND DEVICE, AND STORAGE MEDIUM

(71) Applicant: ZTE Corporation, Shenzhen (CN)

(72) Inventors: Minqiang Zou, Shenzhen (CN); Chuangxin Jiang, Shenzhen (CN); Hao Wu, Shenzhen (CN); Guozeng Zheng, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 294 days.

(21) Appl. No.: 18/576,717

(22) PCT Filed: May 25, 2022

(86) PCT No.: PCT/CN2022/094932
§ 371 (c)(1),
(2) Date: Jan. 4, 2024

(87) PCT Pub. No.: WO2023/279880
PCT Pub. Date: Jan. 12, 2023

(65) Prior Publication Data
US 2024/0305346 A1 Sep. 12, 2024

(30) Foreign Application Priority Data
Jul. 7, 2021 (CN) .......................... 202110767413.2

(51) Int. Cl.
*H04B 7/06* (2006.01)

(52) U.S. Cl.
CPC ......... H04B 7/0626 (2013.01); H04B 7/0632 (2013.01); H04B 7/0639 (2013.01)

(58) Field of Classification Search
CPC .. H04B 7/0626; H04B 7/0632; H04B 7/0639; H04B 7/024; H04W 72/232;
(Continued)

(56) References Cited

U.S. PATENT DOCUMENTS

2021/0258060 A1 8/2021 Gao et al.
2023/0262503 A1* 8/2023 Liu ......................... H04L 5/005
370/252
(Continued)

FOREIGN PATENT DOCUMENTS

CN 108540995 A 9/2018
CN 109391404 A 2/2019
(Continued)

OTHER PUBLICATIONS

International Search Report and Written Opinion for International Application No. PCT/CN2022/094932, mailed Aug. 24, 2022.
(Continued)

*Primary Examiner* — Mohamed A Kamara
(74) *Attorney, Agent, or Firm* — Wolf, Greenfield & Sacks, P.C.

(57) ABSTRACT

Disclosed are a data transmission method and device, and a storage medium. The method may include: preconfiguring a channel state information (CSI) reporting policy and an information field of downlink control information (DCI), the CSI reporting policy includes a second communication node reporting one piece of CSI associated with a Multi Transmission Receiving Point (MTRP) and X pieces of CSI associated with a Single Transmission Receiving Point (STRP), and the information field of the DCI includes a first bit used for indicating a CSI sharing status, X includes 0, 1, and 2; and sending the CSI reporting policy and the DCI to the second communication node, such that the second communication node performs CSI reporting according to the CSI reporting policy and performs CSI sharing according to the information field of the DCI.

20 Claims, 2 Drawing Sheets

Pre-configure a CSI reporting strategy and an SI information field in UCI ╶╴ S310

Perform CSI reporting according to the CSI reporting policy and perform CSI sharing according to the SI information field ╶╴ S320

(58) Field of Classification Search
CPC .... H04W 24/10; H04L 5/0035; H04L 5/0091;
H04L 5/0057
See application file for complete search history.

(56) References Cited

U.S. PATENT DOCUMENTS

| | | | | |
|---|---|---|---|---|
| 2023/0291454 A1* | 9/2023 | Chou | ....................... | H04B 7/10 |
| 2023/0344488 A1* | 10/2023 | Bhat | .................... | H04B 7/0626 |

FOREIGN PATENT DOCUMENTS

| | | | |
|---|---|---|---|
| CN | 111416644 A | 7/2020 |
| CN | 111970726 A | 11/2020 |
| CN | 112292894 A | 1/2021 |
| CN | 112822714 A | 5/2021 |
| WO | WO 2021/059162 A1 | 4/2021 |

OTHER PUBLICATIONS

Extended European Search Report for European Application No. 22836635.7, dated Apr. 4, 2025.

[No Author Listed], On PMI sharing for CSI.enhancements under multi-TRP framework. Lenovo, 3GPP TSG RAN WG1 #105-e, e-Meeting, May 10-27, 2021; R1-2106077:5 pages.

[No Author Listed], Summary of CSI enhancements for MTRP and FDD (Round 0). Huawei, 3GPP Tsg Ran WG1 Meeting #105-e, e-Meeting, May 10-27, 2021; R1-2106070:1-68.

PCT/CN2022/094932, Aug. 24, 2022, International Search Report and Written Opinion.

* cited by examiner

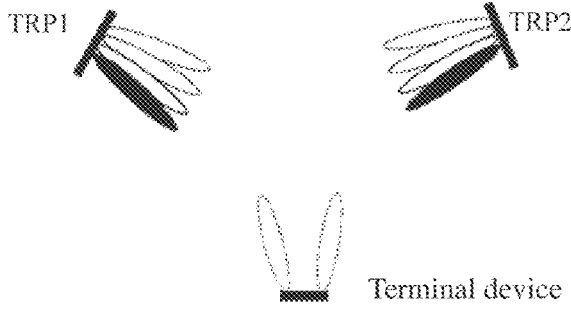

TRP1                    TRP2

Terminal device

FIG. 1

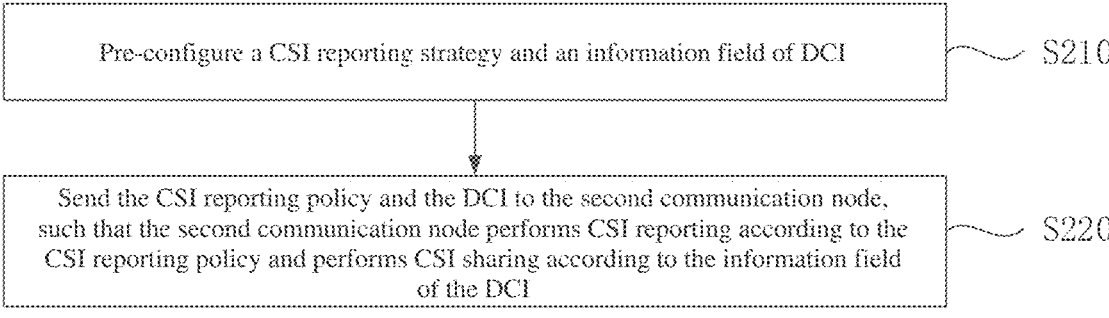

Pre-configure a CSI reporting strategy and an information field of DCI     S210

Send the CSI reporting policy and the DCI to the second communication node, such that the second communication node performs CSI reporting according to the CSI reporting policy and performs CSI sharing according to the information field of the DCI     S220

FIG. 2

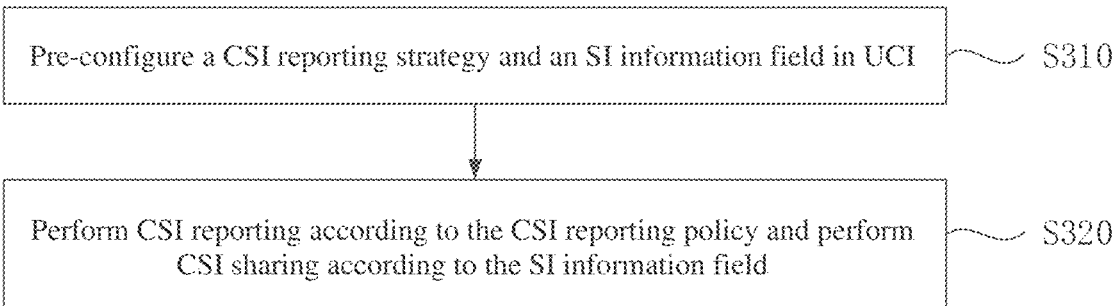

Pre-configure a CSI reporting strategy and an SI information field in UCI     S310

Perform CSI reporting according to the CSI reporting policy and perform CSI sharing according to the SI information field     S320

FIG. 3

DATA TRANSMISSION METHOD AND DEVICE, AND STORAGE MEDIUM

CROSS-REFERENCE TO RELATED APPLICATION

This application is a national stage filing under 35 U.S.C. § 371 of International Patent Application Serial No. PCT/CN2022/094932, filed May 25, 2022, which claims priority to Chinese patent application No. 202110767413.2 filed Jul. 7, 2021. The contents of these applications are incorporated herein by reference in their entirety.

TECHNICAL FIELD

The present disclosure relates to the field of communication technologies, and more particularly, to a data transmission method and device, and a storage medium.

BACKGROUND

In New Radio (NR) Release 15, time and frequency resources controlled by a base station (gNB) can be used by a User Equipment (UE) to report Channel State Information (CSI). To flexibly support CSI acquisition in different ways in different scenarios, NR supports flexible Channel State Information-Reference Signal (CSI-RS) configuration. A base station can flexibly configure the number of CSI-RS resources, a measurement method, and other information according to the required CSI acquisition scheme, to facilitate CSI feedback. However, in the CSI reporting framework, the CSI reporting mechanism of the UE has some problems in supporting Multi Transmission Receiving Point (MTRP) transmission, i.e., a Rank Indicator (RI), a Precoding Matrix Indicator (PMI), and a Channel Quality Indicator (CQI) occupy a large number of uplink resources.

SUMMARY

In view of the above, embodiments of the present disclosure provide a data transmission method and device, and a storage medium.

An embodiment of the present disclosure provides a data transmission method, applied to a first communication node, the method includes: preconfiguring a CSI reporting policy and an information field of DCI, where the CSI reporting policy includes a second communication node reporting one piece of CSI associated with an MTRP and X pieces of CSI associated with a Single Transmission Receiving Point (STRP), and the information field of the DCI includes a first bit used for indicating a CSI sharing status, where X includes 0, 1, and 2; and sending the CSI reporting policy and the DCI to the second communication node, such that the second communication node performs CSI reporting according to the CSI reporting policy and performs CSI sharing according to the information field of the DCI.

An embodiment of the present disclosure provides a data transmission method, applied to a second communication node, the method includes: preconfiguring a CSI reporting policy and a share indication (SI) information field in uplink control information (UCI), where the CSI reporting policy includes a second communication node reporting one piece of CSI associated with an MTRP and X pieces of CSI associated with an STRP, and the SI information field is used for indicating a CSI sharing status, where X includes 0, 1, and 2; and performing CSI reporting according to the CSI reporting policy and performing CSI sharing according to the SI information field.

An embodiment of the present disclosure provides a data transmission apparatus, applied to a first communication node, the apparatus includes: a first pre-configuration module, configured for preconfiguring a CSI reporting policy and an information field of DCI, where the CSI reporting policy includes a second communication node reporting one piece of CSI associated with an MTRP and X pieces of CSI associated with an STRP, and the information field of the DCI includes a first bit used for indicating a CSI sharing status, where X includes 0, 1, and 2; and a transmitter, configured for transmitting the CSI reporting policy and the DCI to the second communication node, such that the second communication node performs CSI reporting according to the CSI reporting policy and performs CSI sharing according to the information field of the DCI.

An embodiment of the present disclosure provides a data transmission apparatus, applied to a second communication node, the apparatus includes: a second pre-configuration module, configured for preconfiguring a CSI reporting policy and an SI information field in UCI, where the CSI reporting policy includes a second communication node reporting one piece of CSI associated with an MTRP and X pieces of CSI associated with an STRP, and the SI information field is used for indicating a CSI sharing status, where X includes 0, 1, and 2; and a transmission module, configured for performing CSI reporting according to the CSI reporting policy and performing CSI sharing according to the SI information field.

An embodiment of the present disclosure provides a data transmission device, including: a communication module, a memory, and one or more processors, where the communication module is configured for performing communication interaction between a first communication node and a second communication node; the memory is configured for storing one or more programs which, when executed by the one or more processors, cause the one or more processors to implement the method according to any one of the embodiments of the present disclosure.

An embodiment of the present disclosure provides a storage medium, storing a computer program which, when executed by a processor, causes the processor to implement the method according to any one of the embodiments of the present disclosure.

BRIEF DESCRIPTION OF DRAWINGS

FIG. 1 is a schematic diagram of an application scenario of CSI transmission according to an embodiment of the present disclosure;

FIG. 2 is a flowchart of a data transmission method according to an embodiment of the present disclosure;

FIG. 3 is a flowchart of another data transmission method according to an embodiment of the present disclosure;

DETAILED DESCRIPTION

Figure 4:
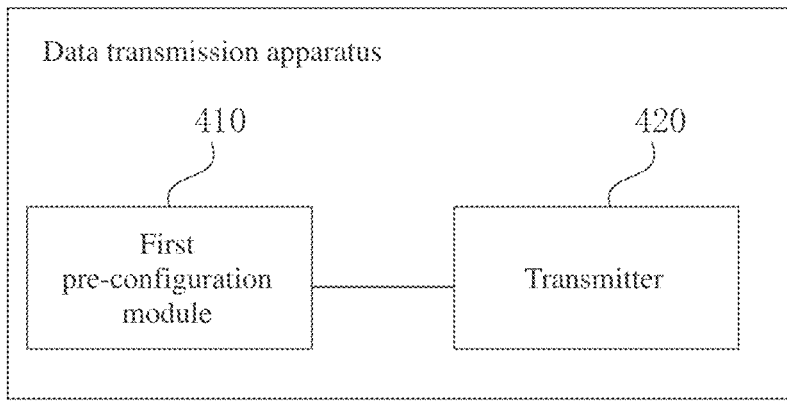
FIG. 4 is a structural block diagram of a data transmission apparatus according to an embodiment of the present disclosure.

The embodiments of the present disclosure will be described in detail below in conjunction with the accompanying drawings. The present disclosure will be described below in conjunction with the accompanying drawings of embodiments, and the examples given are merely used for illustrating the present disclosure and are not intended to limit the scope of the present disclosure.

In the embodiments of the present disclosure, the terms such as "in an embodiment" and "in some embodiments" are used as examples, explanations, or illustrations. Any embodiment or design described following "in an embodiment" and "in some embodiments" in the embodiments of the present disclosure should not be construed as being superior or advantageous over other embodiments or designs. Rather, the use of the terms such as "in an embodiment" and "in some embodiments" is intended to present the relevant concepts in a concrete manner.

To flexibly support CSI acquisition in different ways in different scenarios, NR supports flexible CSI-RS configuration. A base station can flexibly configure the number of CSI-RS resources, a measurement method, and other information according to the required CSI acquisition scheme. In some embodiments, a base station may configure, for a terminal device, one or more CSI-RS resources used for useful channel measurement and one or more Channel State Information Interference Measurement (CSI-IM) resources used for interference measurement. The one or more CSI-RS resources and the one or more CSI-IM resources are in one-to-one correspondence. When there is one CSI-RS resource, the terminal device feeds back CSI such as an RI, a PMI, and a CQI, etc., according to a measurement of the CSI-RS resource. When there are multiple CSI-RS resources, generally a CSI-RS is a precoded CSI-RS, and each CSI-RS resource represents one precoding matrix for the precoding information of a CSI-RS, and may be preset by the base station based on a condition, for example, calculated by traversing Discrete Fourier Transform (DFT) beamforming vectors in full space or according to a measurement of a Sounding Reference Signal (SRS). The terminal device measures these CSI-RSs, selects an optimal CSI-RS, feeds back a CRI indicating this resource, and further feeds back CSI such as an RI, a PMI, and a CQI according to a measurement of this resource. For another example, the base station may configure, for a terminal device, one CSI-RS resource used for useful channel measurement and one or more CSI-RS resources used for interference measurement. In this case, the CSI-RS resource used for useful channel measurement is associated with all the CSI-RS resources used for interference measurement. In the CSI-RS resources used for interference measurement, each CSI-RS antenna port corresponds to one layer of interference, and a channel matrix measured by the terminal device on a plurality of antenna ports of each CSI-RS resource used for interference measurement is an interference channel matrix. Based on this matrix, the terminal device can further calculate a covariance matrix, null space, etc., of an interference channel, for calculating and feeding back an optimal precoding matrix and CQI under the interference channel. However, the existing CSI configuration framework occupies a large number of uplink resources in supporting MTRP communication.

In view of the above, the embodiments of the present disclosure provide a data transmission method, in which several bits of information are configured in DCI or UCI to indicate a rule of CRI, RI, CQI, and PMI sharing, to reduce the data amount of CSI transmitted, thereby reducing uplink resource overheads occupied by reporting CSI in an MTRP.

FIG. 1 is a schematic diagram of an application scenario of CSI transmission according to an embodiment of the present disclosure. FIG. 1 shows a schematic diagram of communication between two Transmission Receiving Points (TRPs) (for example, a TRP 1 and a TRP 2) and a terminal device. The TRP 1 and TRP 2 are any device on a base station side. The base station side may flexibly configure the number of Channel Measurement Reference signal (CMR) resources, a measurement method, etc. As shown in FIG. 1, the TRP (e.g., the TRP 1 or the TRP 2) may send one or more CSI-RS resources to the terminal device through a beam. In addition, the TRP may further configure one or more CSI report configurations (CSI-ReportConfig) and one or more CSI resource configurations (CSI-ResourceConfig) for the terminal device. One CSI report configuration may be linked to a maximum of three CSI resource configurations. The terminal device calculates CSI by measuring these reference signal resources and reports the CSI to the base station. The following embodiments are all described using the scenario shown in FIG. 1 as an example.

In an embodiment, FIG. 2 is a flowchart of a data transmission method according to an embodiment of the present disclosure. This embodiment is applied to a first communication node. The first communication node may be on the base station side. As shown in FIG. 2, the data transmission method in this embodiment includes the following steps S210 to S220.

At S210, a CSI reporting strategy and an information field of DCI are pre-configured.

The CSI reporting strategy includes a second communication node reporting one piece of CSI associated with an MTRP and X pieces of CSI associated with an STRP, and the information field of the DCI includes a first bit used for indicating a CSI sharing status, where X includes 0, 1, and 2.

At S220, the CSI reporting policy and the DCI are sent to the second communication node, such that the second communication node performs CSI reporting according to the CSI reporting policy and performs CSI sharing according to the information field of the DCI.

In the embodiment, the first communication node pre-configures the CSI reporting strategy, and adds an information field in the DCI to indicate a rule of CRI, RI, CQI, and PMI sharing, such that the second communication node reports only part of CSI. In this way, the data amount of CSI transmitted is reduced, thereby reducing uplink resource overheads occupied by reporting CSI in an MTRP.

In an embodiment, when X is 2 and one bit in the information field of the DCI is used to indicate the CSI sharing status, preconfiguring a CSI reporting policy and an information field of DCI includes:

when the first bit is a first value, preconfiguring the second communication node to report all CSI; or when the first bit is a second value, preconfiguring the second communication node to report the CSI associated with the MTRP and the CRI associated with the STRP, and preconfiguring the first communication node to share an RI, a CQI, and a PMI associated with the MTRP into the CSI associated with the STRP.

In an embodiment, the first communication node may further configure several bits of information to indicate a rule of sub-band CQI and sub-band PMI sharing. When the first bit is the second value, the information field of the DCI further includes a second bit used for indicating a CQI sharing status and a third bit used for indicating a PMI sharing status;

when the second bit is the first value, the first communication node is pre-configured to share a wideband CQI and share no sub-band CQI; and when the second bit is the second value, the first communication node is pre-configured to share both the wideband CQI and the sub-band CQI; and when the third bit is the first value, the first communication node is pre-configured to share a wideband PMI and share no sub-band PMI; and when the third bit is the second value, the first communication node is pre-configured to share both the wideband PMI and a sub-band PMI.

In an embodiment, when X is 2 and two bits in the information field of the DCI are used to indicate the CSI sharing status, preconfiguring a CSI reporting policy and an information field of DCI includes:

when the first bit is a third value, preconfiguring the second communication node to report all CSI;

when the first bit is a fourth value, preconfiguring the second communication node to report the CSI associated with the MTRP and the CRI associated with the STRP, and preconfiguring the first communication node to share an RI, a CQI, and a PMI associated with the MTRP into the CSI associated with the STRP;

when the first bit is a fifth value, preconfiguring the second communication node to report the CSI associated with the MTRP, CSI associated with a first TRP in the STRP, and CRI associated with a second TRP in the STRP, and pre-configuring the first communication node to share an RI, a CQI, and a PMI associated with a second TRP in the MTRP into CSI associated with the second TRP in the STRP; or when the first bit is a sixth value, preconfiguring the second communication node to report the CSI associated with the MTRP, CSI associated with a second TRP in the STRP, and CRI associated with a first TRP in the STRP, and pre-configuring the first communication node to share an RI, a CQI, and a PMI associated with a first TRP in the MTRP into CSI associated with the first TRP in the STRP. In some embodiments, the first value may be 0, the second value may be 1, the third value may be 00, the fourth value may be 11, the fifth value may be 01, and the sixth value may be 10.

In an embodiment, when the first bit is the fourth value, the information field of the DCI further includes a second bit used for indicating a CQI sharing status and a third bit used for indicating a PMI sharing status;

when the second bit is the first value, the first communication node is pre-configured to share a first wideband CQI in the MTRP into the first TRP in the STRP and share a second wideband CQI in the MTRP into the second TRP in the STRP;

when the second bit is the second value, the first communication node is pre-configured to share both the first wideband CQI and a first sub-band CQI in the MTRP into the first TRP in the STRP and share both the second wideband CQI and a second sub-band CQI in the MTRP into the second TRP in the STRP;

when the third bit is the first value, the first communication node is pre-configured to share a first wideband PMI in the MTRP into the first TRP in the STRP and share a second wideband PMI in the MTRP into the second TRP in the STRP; and when the third bit is the second value, the first communication node is pre-configured to share both the first wideband PMI and a first sub-band PMI in the MTRP into the first TRP in the STRP and share both the second wideband PMI and a second sub-band PMI in the MTRP into the second TRP in the STRP.

6

In an embodiment, when the first bit is the fifth value, the information field of the DCI further includes a second bit used for indicating a CQI sharing status and a third bit used for indicating a PMI sharing status;

when the second bit is the first value, the first communication node is pre-configured to share a second wideband CQI in the MTRP into the second TRP in the STRP;

when the second bit is the second value, the first communication node is pre-configured to share both the second wideband CQI and a second sub-band CQI in the MTRP into the second TRP in the STRP;

when the third bit is the first value, the first communication node is pre-configured to share a second wideband PMI in the MTRP into the second TRP in the STRP; and when the third bit is the second value, the first communication node is pre-configured to share both the second wideband PMI and a second sub-band PMI in the MTRP into the second TRP in the STRP.

In an embodiment, when the first bit is the sixth value, the information field of the DCI further includes a second bit used for indicating a CQI sharing status and a third bit used for indicating a PMI sharing status;

when the second bit is the first value, the first communication node is pre-configured to share a first wideband CQI in the MTRP into the first TRP in the STRP;

when the second bit is the second value, the first communication node is pre-configured to share both the first wideband CQI and a first sub-band CQI in the MTRP into the first TRP in the STRP;

when the third bit is the first value, the first communication node is pre-configured to share a first wideband PMI in the MTRP into the first TRP in the STRP; and when the third bit is the second value, the first communication node is pre-configured to share both the first wideband PMI and a first sub-band PMI in the MTRP into the first TRP in the STRP.

In an embodiment, when X is 1 and one bit in the information field of the DCI is used to indicate the CSI sharing status, preconfiguring a CSI reporting policy and an information field of DCI includes:

when the first bit is a first value, preconfiguring the second communication node to report all CSI; or when the first bit is a second value, preconfiguring the second communication node to report the CSI associated with the MTRP and a CRI associated with a first TRP in the STRP, and preconfiguring the first communication node to share an RI, a CQI, and a PMI associated with a first TRP in the MTRP into the CSI associated with the first TRP in the STRP.

In an embodiment, when the first bit is the second value, the information field of the DCI further includes a second bit used for indicating a CQI sharing status and a third bit used for indicating a PMI sharing status;

when the second bit is the first value, the first communication node is pre-configured to share a wideband CQI and share no sub-band CQI; and when the second bit is the second value, the first communication node is pre-configured to share both the wideband CQI and the sub-band CQI; and when the third bit is the first value, the first communication node is pre-configured to share a wideband PMI and share no sub-band PMI; and when the third bit is the second value, the first communication node is pre-configured to share both the wideband PMI and a sub-band PMI.

In an embodiment, when X is 0 and one bit in the information field of the DCI is used to indicate the CSI sharing status, preconfiguring a CSI reporting policy and an information field of DCI includes:

when the first bit is a first value, preconfiguring the second communication node to report all CSI; or when the first bit is a second value, preconfiguring the second communication node to report the CSI associated with the MTRP, and pre-configuring the first communication node to share CSI associated with a first TRP in the MTRP into CSI associated with a first TRP in the STRP and share CSI associated with a second TRP in the MTRP into CSI associated with a second TRP in the STRP. In an embodiment, the process of configuring the information field of the DCI is described using an example where the first communication node is on a base station side, the second communication node is on a UE side, and the base station side (for example, the TRP 1 and the TRP 2) configures several bits of information in the DCI to indicate a rule of CRI, RI, CQI, and PMI sharing. It is assumed that $K_1$ CMRs are configured in the TRP 1 and $K_2$ CMRs are configured in the TRP 2, where $K_1$ and $K_2$ are positive integers greater than 1. There is a pairing relationship between each of N pairs of CMRs. CMRs in each pair are from different TRPs. In other words, the CMRs in each pair are from the TRP 1 and the TRP 2, respectively.

In a CSI report configuration, a CSI reporting mechanism (or referred to as a CSI reporting policy) on the UE side may be configured by the base station as follows: the UE side reports one piece of CSI associated with the MTRP and X pieces of CSI associated with the STRP, where X=2, 1, or 0.

In some embodiments, X=2, i.e., the UE side reports one piece of CSI associated with the MTRP and two pieces of CSI associated with the STRP. The CSI associated with the MTRP includes [CRI_m1 CRI_m2], [RI_m1 RI_m2], [CQI_m1 CQI_m2], and [PMI_m1 PMI_m2]. The two pieces of CSI associated with the STRP respectively include CRI_s1, RI_s1, CQI_s1, and PMI_s1 associated with the TRP 1, and CRI_s2, RI_s2, CQI_s2, and PMI_s2 associated with the TRP 2.

When X=2 and the base station side uses one bit of information, shareenable, to indicate whether the UE side performs CSI sharing, i.e., when the first bit in the above embodiment is one bit:

if shareenable=0, it indicates that no CSI is shared, as shown in Table 1, i.e., all CSI is reported.

If shareenable=1, it indicates that the CSI is shared, and as shown in Table 2, the CSI reported by the UE side includes: [CRI_m1 CRI_m2], [RI_m1 RI_m2], [CQI_m1 CQI_m2], and [PMI_m1 PMI_m2] associated with the MTRP; CRI_s1 associated with the TRP 1; and CRI_s2 associated with the TRP 2. In other words, the UE does not need to report RI_s1, CQI_s1, and PMI_s1 associated with the TRP 1, and RI_s2, CQI_s2, and PMI_s2 associated with the TRP 2. The base station side shares the received CSI including [RI_m1 RI_m2], [CQI_m1 CQI_m2], and [PMI_m1 PMI_m2] associated with the MTRP into two pieces of CSI associated with the STRP.

8

TABLE 1

| | CSI is not shared | | | |
| | MTRP | | STRP | |
| CSI | TRP 1 | TRP 2 | TRP 1 | TRP 2 |
| --- | --- | --- | --- | --- |
| CRI | CRI_m1 | CRI_m2 | CRI_s1 | CRI_s2 |
| RI | RI_m1 | RI_m2 | RI_s1 | RI_s2 |
| CQI | CQI_m1 | CQI_m2 | CQI_s1 | CQI_s2 |
| PMI | PMI_m1 | PMI_m2 | PMI_s1 | PMI_s2 |

TABLE 2

| | CSI is shared | | | |
| | MTRP | | STRP | |
| CSI | TRP 1 | TRP 2 | TRP 1 | TRP 2 |
| --- | --- | --- | --- | --- |
| CRI | CRI_m1 | CRI_m2 | CRI_s1 | CRI_s2 |
| RI | RI_m1 | RI_m2 | RI_m1 | RI_m2 |
| CQI | CQI_m1 | CQI_m2 | CQI_m1 | CQI_m2 |
| PMI | PMI_m1 | PMI_m2 | PMI_m1 | PMI_m2 |

In an embodiment, when X=2 and the 1-bit information, shareenable, used by the base station side to indicate the CSI sharing status is a value of 1, the base station side may further configure a 1-bit cqishareenable (i.e., the second bit in the above embodiment) to indicate a wideband CQI and sub-band CQI sharing status, and configure a 1-bit pmishareenable (i.e., the third bit in the above embodiment) to indicate a wideband PMI and sub-band PMI sharing status.

When cqishareenable=0, it indicates that a wideband CQI is shared and no sub-band CQI is shared.

When cqishareenable=1, it indicates that both the wideband CQI and the sub-band CQI are shared.

When pmishareenable=0, it indicates that a wideband PMI is shared and no sub-band PMI is shared.

When pmishareenable=1, it indicates that both the wideband PMI and the sub-band PMI are shared.

When X=2 and the base station side uses two bits of information, shareenable, to indicate whether the UE side performs CSI sharing, i.e., when the first bit in the above embodiment includes two bits:

if shareenable=00, it indicates that no CSI is shared, as shown in Table 1, i.e., all CSI is reported.

If shareable=11, it indicates that the CSI is shared, and as shown in Table 2, the CSI reported by the UE side includes: [CRI_m1 CRI_m2], [RI_m1 RI_m2], [CQI_m1 CQI_m2], and [PMI_m1 PMI_m2] associated with the MTRP; CRI_s1 associated with the TRP 1; and CRI_s2 associated with the TRP 2. In other words, the UE does not need to report RI_s1, CQI_s1, and PMI_s1 associated with the TRP 1, and RI_s2, CQI_s2, and PMI_s2 associated with the TRP 2. The base station side shares the received CSI including [RI_m1 RI_m2]. [CQI_m1 CQI_m2], and [PMI_m1 PMI_m2] associated with the MTRP into two pieces of CSI associated with the STRP.

If shareenable=01, it indicates that CSI of the TRP 2 is shared, and as shown in Table 3, the CSI reported by the UE side includes: [CRI_m1 CRI_m2], [RI_m1 RI_m2], [CQI_m1 CQI_m2], and [PMI_m1 PMI_m2] associated with the MTRP; CRI_s1. RI_s1, CQI_s1, and PMI_s1 associated with the TRP 1; and CRI_s2 associated with the TRP 2. In other words, the UE does not need to report RI_s2, CQI_s2, and PMI_s2 associated with the TRP 2. The base station side shares the received CSI including RI_m2, CQI_m2, and PMI_m2 associated with the MTRP into CSI associated with the STRP 2.

If shareenable=10, it indicates that the CSI of the TRP 1 is shared. As shown in Table 4, the CSI reported by the UE side includes: [CRI_m1 CRI_m2], [RI_m1 RI_m2], [CQI_m1 CQI_m2], and [PMI_m1 PMI_m2] associated with the MTRP; CRI_s2. RI_s2, CQI_s2, and PMI_s2 associated with the TRP 2; and CRI_s1 associated with the TRP 1. In other words, the UE does not need to report RI_s1, CQI_s1, and PMI_s1 associated with the TRP 1. The base station side shares the received CSI including RI_m1, CQI_m1, and PMI_m1 associated with the MTRP into CSI associated with the STRP 1.

TABLE 3

| | Part of CSI is shared | | | |
| --- | --- | --- | --- | --- |
| | MTRP | | STRP | |
| CSI | TRP 1 | TRP 2 | TRP 1 | TRP 2 |
| CRI | CRI_m1 | CRI_m2 | CRI_s1 | CRI_s2 |
| RI | RI_m1 | RI_m2 | RI_s1 | RI_m2 |
| CQI | CQI_m1 | CQI_m2 | CQI_s1 | CQI_m2 |
| PMI | PMI_m1 | PMI_m2 | PMI_s1 | PMI_m2 |

TABLE 4

| | Part of CSI is shared | | | |
| --- | --- | --- | --- | --- |
| | MTRP | | STRP | |
| CSI | TRP 1 | TRP 2 | TRP 1 | TRP 2 |
| CRI | CRI_m1 | CRI_m2 | CRI_s1 | CRI_s2 |
| RI | RI_m1 | RI_m2 | RI_m1 | RI_s2 |
| QI | QI_m1 | CQI_m2 | CQI_m1 | CQI_s2 |
| MI | MI_m1 | PMI_m2 | PMI_m1 | PMI_s2 |

In an embodiment, when X=2 and the 2-bit information, shareenable, used by the base station side to indicate the CSI sharing status is a value of 01 (i.e., the first bit is the fifth value), the base station may further configure a 1-bit cqishareenable (i.e., the second bit in the above embodiment) and a 1-bit pmishareenable (i.e., the third bit in the above embodiment).

When cqishareenable=0, it indicates that a wideband CQI_m2 in the MTRP is shared into the STRP 2, and no sub-band CQI in the MTRP is shared.

When cqishareenable=1, it indicates that both the wideband CQI_m2 and a sub-band CQI_m2 in the MTRP are shared into the STRP 2.

When pmishareenable=0, it indicates that a wideband PMI_m2 in the MTRP is shared into the STRP 2, and no sub-band PMI in the MTRP is shared.

When pmishareenable=1, it indicates that both the wideband PMI_m2 and a sub-band PMI_m2 in the MTRP are shared into the STRP 2.

When X=2 and the 2-bit information, shareenable, used by the base station side to indicate the CSI sharing status is a value of 10 (i.e., the first bit is the fifth value), the base station may further configure a 1-bit cqishareenable (i.e., the second bit in the above embodiment) and a 1-bit pmishareenable (i.e., the third bit in the above embodiment).

When cqishareenable=0, it indicates that a wideband CQI_m1 in the MTRP is shared into the STRP 1, and no sub-band CQI in the MTRP is shared.

When cqishareenable=1, it indicates that both the wideband CQI_m1 and a sub-band CQI_m1 in the MTRP are shared into the STRP 1.

When pmishareenable=0, it indicates that a wideband PMI_m1 in the MTRP is shared into the STRP 1, and no sub-band PMI in the MTRP is shared.

When pmishareenable=1, it indicates that both the wideband PMI_m1 and a sub-band PMI_m1 in the MTRP are shared into the STRP 1.

When X=2 and the 2-bit information, shareenable, used by the base station side to indicate the CSI sharing status is a value of 11 (i.e., the first bit is the fourth value), the base station may further configure a 1-bit cqishareenable (i.e., the second bit in the above embodiment) and a 1-bit pmishareenable (i.e., the third bit in the above embodiment).

When cqishareenable=0, it indicates that a wideband CQI_m1 in the MTRP is shared into the STRP 1, a wideband CQI_m2 in the MTRP is shared into the STRP 2, and no sub-band CQI in the MTRP is shared.

When cqishareenable=1, it indicates that both the wideband CQI_m1 and a sub-band CQI_m1 in the MTRP are shared into the STRP 1, and both the wideband CQI_m2 and a sub-band CQI_m2 in the MTRP are shared into the STRP 2.

When pmishareenable=0, it indicates that a wideband PMI_m1 in the MTRP is shared into the STRP 1, a wideband PMI_m2 in the MTRP is shared into the STRP 2, and no sub-band PMI in the MTRP is shared.

When pmishareenable=1, it indicates that both the wideband PMI_m1 and a sub-band PMI_m1 in the MTRP are shared into the STRP 1, and both the wideband PMI_m2 and a sub-band PMI_m2 in the MTRP are shared into the STRP 2.

In some embodiments, X=1, i.e., the UE side reports one piece of CSI associated with the MTRP and one piece of CSI associated with the STRP. The CSI associated with the MTRP includes [CRI_m1 CRI_m2]. [RI_m1 RI_m2], [CQI_m1 CQI_m2], and [PMI_m1 PMI_m2]. The CSI associated with the STRP includes CRI_s1. RI_s1, CQI_s1, and PMI_s1.

When X=1 and the base station side uses one bit of information, shareenable, to indicate whether the UE side performs CSI sharing. i.e., when the first bit in the above embodiment is one bit:

if shareenable=0, it indicates that no CSI is shared, as shown in Table 5, i.e., all CSI is reported.

If shareenable=1, it indicates that the CSI is shared, and as shown in Table 6, the CSI reported by the UE side includes: [CRI_m1 CRI_m2], [RI_m1 RI_m2], [CQI_m1 CQI_m2], and [PMI_m1 PMI_m2] associated with the MTRP; and CRI_s1 associated with the TRP 1. In other words, the UE does not need to report RI_s1, CQI_s1, and PMI_s1 associated with the TRP 1. The base station side shares the received CSI including RI_m1, CQI_m1, and PMI_m1 associated with the MTRP into CSI associated with the STRP 1.

TABLE 5

| | CSI is not shared | | |
|---|---|---|---|
| | MTRP | | STRP |
| CSI | TRP 1 | TRP 2 | TRP 1 |
| CRI | CRI_m1 | CRI_m2 | CRI_s1 |
| RI | RI_m1 | RI_m2 | RI_s1 |
| CQI | QI_m1 | CQI_m2 | CQI_s1 |
| MI | PMI_m1 | PMI_m2 | PMI_s1 |

TABLE 7

| | CSI is not shared | |
|---|---|---|
| | MTRP | |
| CSI | TRP 1 | TRP 2 |
| CRI | CRI_m1 | CRI_m2 |
| RI | RI_m1 | RI_m2 |
| QI | CQI_m1 | CQI_m2 |
| MI | PMI_m1 | PMI_m2 |

TABLE 6

| | CSI is shared | | |
|---|---|---|---|
| | MTRP | | STRP |
| CSI | TRP 1 | TRP 2 | TRP 1 |
| RI | CRI_m1 | CRI_m2 | CRI_s1 |
| RI | RI_m1 | RI_m2 | RI_m1 |
| CQI | CQI_m1 | CQI_m2 | CQI_m1 |
| PMI | PMI_m1 | PMI_m2 | PMI_m1 |

TABLE 8

| | CSI is shared | | | |
|---|---|---|---|---|
| | MTRP | | STRP | |
| CSI | TRP 1 | TRP 2 | TRP 1 | TRP 2 |
| CRI | CRI_m1 | CRI_m2 | CRI_m1 | CRI_m2 |
| RI | RI_m1 | RI_m2 | RI_m1 | RI_m2 |
| CQI | CQI_m1 | CQI_m2 | CQI_m1 | CQI_m2 |
| PMI | PMI_m1 | PMI_m2 | PMI_m1 | PMI_m2 |

In an embodiment, when X=1 and the 1-bit information, shareenable, used by the base station side to indicate the CSI sharing status is a value of 1, the base station side may further configure a 1-bit cqishareenable (i.e., the second bit in the above embodiment) to indicate a wideband CQI and sub-band CQI sharing status, and configure a 1-bit pmishareenable (i.e., the third bit in the above embodiment) to indicate a wideband PMI and sub-band PMI sharing status.

When cqishareenable=0, it indicates that a wideband CQI is shared and no sub-band CQI is shared.

When cqishareenable=1, it indicates that both the wideband CQI and a sub-band CQI are shared.

When pmishareenable=0, it indicates that a wideband PMI is shared and no sub-band PMI is shared.

When pmishareenable=1, it indicates that both the wideband PMI and a sub-band PMI are shared.

In some embodiments. X=0, i.e., the UE side reports one piece of CSI associated with the MTRP. The CSI associated with the MTRP includes [CRI_m1 CRI_m2], [RI_m1 RI_m2], [CQI_m1 CQI_m2], and [PMI_m1 PMI_m2]. The UE side does not report the CSI associated with the STRP.

When X=0 and the base station side uses one bit of information, shareenable, to indicate whether the UE side performs CSI sharing. i.e., when the first bit in the above embodiment is one bit:

if shareenable=0, it indicates that no CSI is shared, as shown in Table 7, the UE side reports one piece of CSI associated with the MTRP. i.e., the UE side reports [CRI_m1 CRI_m2], [RI_m1 RI_m2], [CQI_m1 CQI_m2], and [PMI_m1 PMI_m2] associated with the MTRP.

If shareenable=1, it indicates that the CSI is shared, and as shown in Table 8, the CSI reported by the UE side includes: [CRI_m1 CRI_m2], [RI_m1 RI_m2], [CQI_m1 CQI_m2], and [PMI_m1 PMI_m2] associated with the MTRP. In other words, the UE does not report CRI_s1, RI_s1, CQI_s1, and PMI_s1 associated with the TRP 1, and CRI_s2, RI_s2, CQI_s2, and PMI_s2 associated with the TRP 2. The base station side shares the received CSI including [CRI_m1 CRI_m2], [RI_m1 RI_m2], [CQI_m1 CQI_m2], and [PMI_m1 PMI_m2] associated with the MTRP into two pieces of CSI associated with the STRP.

In an embodiment, FIG. 3 is a flowchart of another data transmission method according to an embodiment of the present disclosure. This embodiment is applied to a second communication node. The second communication node may be on a UE side. As shown in FIG. 3, the data transmission method in this embodiment includes the following steps S310 to S320.

At S310, a CSI reporting policy and an SI information field in UCI are pre-configured.

The CSI reporting strategy includes a second communication node reporting one piece of CSI associated with an MTRP and X pieces of CSI associated with an STRP, and the SI information field is used for indicating a CSI sharing status, where X includes 0, 1, and 2.

At S320, CSI reporting is performed according to the CSI reporting policy and CSI sharing is performed according to the SI information field.

In this embodiment, the second communication node pre-configures the CSI reporting strategy, and adds an SI information field in the UCI to indicate a rule of CRI, RI, CQI, and PMI sharing, such that the second communication node reports only part of CSI. In this way, the data amount of CSI transmitted is reduced, thereby reducing uplink resource overheads occupied by reporting CSI in an MTRP.

In an embodiment, when X is 2 and one bit in the SI information field is used to indicate the CSI sharing status, preconfiguring a CSI reporting policy and an SI information field in UCI includes:

when the SI information field is a first value, preconfiguring the second communication node to report all CSI; or when the SI information field is a second value, preconfiguring the second communication node to report the CSI associated with the MTRP and the CRI associated with the STRP, and preconfiguring the first communication node to share an RI, a CQI, and a PMI associated with the MTRP into the CSI associated with the STRP.

In an embodiment, the second communication node may further configure several bits of information to indicate a rule of sub-band CQI and sub-band PMI sharing. When the SI information field is the second value, the information field of the UCI further includes a second bit used for indicating a CQI sharing status and a third bit used for indicating a PMI sharing status;

when the second bit is the first value, the first communication node is pre-configured to share a wideband CQI and share no sub-band CQI; and when the second bit is the second value, the first communication node is pre-configured to share both the wideband CQI and a sub-band CQI; and when the third bit is the first value, the first communication node is pre-configured to share a wideband PMI and share no sub-band PMI; and when the third bit is the second value, the first communication node is pre-configured to share both the wideband PMI and a sub-band PMI.

In an embodiment, when X is 2 and two bits in the SI information field are used to indicate the CSI sharing status, preconfiguring a CSI reporting policy and an SI information field in UCI includes:

when the SI information field is a third value, preconfiguring the second communication node to report all CSI information;

when the SI information field is a fourth value, preconfiguring the second communication node to report the CSI associated with the MTRP and the CRI associated with the STRP, and preconfiguring the first communication node to share an RI, a CQI, and a PMI associated with the MTRP into the CSI associated with the STRP;

when the SI information field is a fifth value, preconfiguring the second communication node to report the CSI associated with the MTRP, CSI associated with a first TRP in the STRP, and CRI associated with a second TRP in the STRP, and pre-configuring the first communication node to share an RI, a CQI, and a PMI associated with a second TRP in the MTRP into CSI associated with the second TRP in the STRP; or when the SI information field is a sixth value, preconfiguring the second communication node to report the CSI associated with the MTRP, CSI associated with a second TRP in the STRP, and CRI associated with a first TRP in the STRP, and pre-configuring the first communication node to share an RI, a CQI, and a PMI associated with a first TRP in the MTRP into CSI associated with the first TRP in the STRP. In some embodiments, the first value may be 0, the second value may be 1, the third value may be 00, the fourth value may be 11, the fifth value may be 01, and the sixth value may be 10.

In an embodiment, when the SI information field is the fourth value, the information field of the UCI further includes a second bit used for indicating a CQI sharing status and a third bit used for indicating a PMI sharing status; and when the second bit is the first value, the first communication node is pre-configured to share a first wideband CQI in the MTRP into the first TRP in the STRP and share a second wideband CQI in the MTRP into the second TRP in the STRP;

when the second bit is the second value, the first communication node is pre-configured to share both the first wideband CQI and a first sub-band CQI in the MTRP into the first TRP in the STRP and share both the second wideband CQI and a second sub-band CQI in the MTRP into the second TRP in the STRP;

when the third bit is the first value, the first communication node is pre-configured to share a first wideband PMI in the MTRP into the first TRP in the STRP and share a second wideband PMI in the MTRP into the second TRP in the STRP; and when the third bit is the second value, the first communication node is pre-configured to share both the first wideband PMI and a first sub-band PMI in the MTRP into the first TRP in the STRP and share both the second wideband PMI and a second sub-band PMI in the MTRP into the second TRP in the STRP.

In an embodiment, when the SI information field is the fifth value, the information field of the UCI further includes a second bit used for indicating a CQI sharing status and a third bit used for indicating a PMI sharing status;

when the second bit is the first value, the first communication node is pre-configured to share a second wideband CQI in the MTRP into the second TRP in the STRP;

when the second bit is the second value, the first communication node is pre-configured to share both the second wideband CQI and a second sub-band CQI in the MTRP into the second TRP in the STRP;

when the third bit is the first value, the first communication node is pre-configured to share a second wideband PMI in the MTRP into the second TRP in the STRP; and when the third bit is the second value, the first communication node is pre-configured to share both the second wideband PMI and a second sub-band PMI in the MTRP into the second TRP in the STRP.

In an embodiment, when the SI information field is the sixth value, the information field of the UCI further includes a second bit used for indicating a CQI sharing status and a third bit used for indicating a PMI sharing status;

when the second bit is the first value, the first communication node is pre-configured to share a first wideband CQI in the MTRP into the first TRP in the STRP;

when the second bit is the second value, the first communication node is pre-configured to share both the first wideband CQI and a first sub-band CQI in the MTRP into the first TRP in the STRP;

when the third bit is the first value, the first communication node is pre-configured to share a first wideband PMI in the MTRP into the first TRP in the STRP; and when the third bit is the second value, the first communication node is pre-configured to share both the first wideband PMI and a first sub-band PMI in the MTRP into the first TRP in the STRP.

In an embodiment, when X is 1 and one bit in the SI information field is used to indicate the CSI sharing status, preconfiguring a CSI reporting policy and an SI information field in UCI includes:

when the SI information field is a first value, preconfiguring the second communication node to report all CSI; or when the SI information field is a second value, preconfiguring the second communication node to report the CSI associated with the MTRP and a CRI associated with a first TRP in the STRP, and preconfiguring the first communication node to share an RI, a CQI, and a PMI associated with a first TRP in the MTRP into the CSI associated with the first TRP in the STRP.

In an embodiment, when the SI information field is the second value, the information field of the UCI further includes a second bit used for indicating a CQI sharing status and a third bit used for indicating a PMI sharing status;

when the second bit is the first value, the first communication node is pre-configured to share a wideband CQI and share no sub-band CQI; and when the second bit is the second value, the first communication node is pre-configured to share both the wideband CQI and a sub-band CQI; and when the third bit is the first value, the first communication node is pre-configured to share a wideband PMI and share no sub-band PMI; and when the third bit is the second value, the first communication node is pre-configured to share both the wideband PMI and a sub-band PMI.

In an embodiment, when X is 0 and one bit in the SI information field is used to indicate the CSI sharing status, preconfiguring a CSI reporting policy and an SI information field in UCI includes:

when the SI information field is a first value, preconfiguring the second communication node to report all CSI; or when the SI information field is a second value, preconfiguring the second communication node to report the CSI associated with the MTRP, and pre-configuring the first communication node to share CSI associated with a first TRP in the MTRP into CSI associated with a first TRP in the STRP and share CSI associated with a second TRP in the MTRP into CSI associated with a second TRP in the STRP.

In an embodiment, the SI information field is determined in one of the following manners: determined by an RI of the MTRP and an RI of the STRP; or determined by a CRI of the MTRP, the RI of the MTRP, a CRI of the STRP, and the RI of the STRP.

In an embodiment, the process of configuring the SI information field in the UCI is described using an example where the first communication node is on a base station side (for example, the TRP 1 and the TRP 2), the second communication node is on a UE side, and the UE side configures several bits of information in the SI information field in the UCI to indicate a rule of CRI, RI, CQI, and PMI sharing. It is assumed that $K_1$ CMRs are configured in the TRP 1 and $K_2$ CMRs are configured in the TRP 2, where $K_1$ and $K_2$ are positive integers greater than 1. There is a pairing relationship between each of N pairs of CMRs. CMRs in each pair are from different TRPs. In other words, the CMRs in each pair are from the TRP 1 and the TRP 2, respectively.

In a CSI report configuration, a CSI reporting mechanism (or referred to as a CSI reporting policy) on the UE side may be configured by the base station as follows: the UE side reports one piece of CSI associated with the MTRP and X pieces of CSI associated with the STRP, where X=2, 1, or 0.

In some embodiments, X=2, i.e., the UE side reports one piece of CSI associated with the MTRP and two pieces of CSI associated with the STRP. The CSI associated with the MTRP includes [CRI_m1 CRI_m2], [RI_m1 RI_m2], [CQI_m1 CQI_m2], and [PMI_m1 PMI_m2]. The two pieces of CSI associated with the STRP respectively includes CRI_s1, RI_s1, CQI_s1, and PMI_s1 associated with the TRP 1, and CRI_s2, RI_s2, CQI_s2, and PMI_s2 associated with the TRP 2.

In an embodiment, the UE side may determine according to the RIs whether to share the CSI. In this embodiment, X=2, and the UE side adds a 1-bit SI information field in the UCI to indicate the CSI sharing status.

When X=2, if RI_m1=RI_s1 and RI_m2=RI_s2, then SI=1, i.e., the RI, the PMI, and the CQI in MTRP are all shared into the STRP. As shown in Table 9, the CSI reported by the UE side includes: [CRI_m1 CRI_m2], [RI_m1 RI_m2], [CQI_m1 CQI_m2], and [PMI_m1 PMI_m2] associated with the MTRP; CRI_s1 associated with the TRP 1; and CRI_s2 associated with the TRP 2. In other words, the UE does not report RI_s1, CQI_s1, and PMI_s1 associated with the TRP 1, and RI_s2, CQI_s2, and PMI_s2 associated with the TRP 2. The base station side shares the received CSI including [RI_m1 RI_m2], [CQI_m1 CQI_m2], and [PMI_m1 PMI_m2] associated with the MTRP into two pieces of CSI associated with the STRP.

When X=2, if RI_m1 !=RI_s1 or RI_m2 !=RI_s2, then SI=0, i.e., none of the RI, the PMI, and the CQI in MTRP is shared into the STRP, i.e., no CSI is shared. As shown in Table 10, all CSI is reported.

TABLE 9

| | | | | |
|---|---|---|---|---|
| | CSI is shared | | | |
| | MTRP | | STRP | |
| CSI | TRP 1 | TRP 2 | TRP 1 | TRP 2 |
| CRI | CRI_m1 | CRI_m2 | CRI_s1 | CRI_s2 |
| RI | RI_m1 | RI_m2 | RI_m1 | RI_m2 |
| CQI | CQI_m1 | CQI_m2 | CQI_m1 | CQI_m2 |
| PMI | PMI_m1 | PMI_m2 | PMI_m1 | PMI_m2 |

TABLE 10

| | | | | |
|---|---|---|---|---|
| | CSI is not shared | | | |
| | MTRP | | STRP | |
| CSI | TRP 1 | TRP 2 | TRP 1 | TRP 2 |
| CRI | CRI_m1 | CRI_m2 | CRI_s1 | CRI_s2 |
| RI | RI_m1 | RI_m2 | RI_s1 | RI_s2 |
| CQI | CQI_m1 | CQI_m2 | CQI_s1 | CQI_s2 |
| PMI | PMI_m1 | PMI_m2 | PMI_s1 | PMI_s2 |

In an embodiment, the UE side may determine according to the CRIs and the RIs whether to share the CSI. In this embodiment, the UE side adds a 1-bit SI information field in the UCI to indicate the CSI sharing status.

When X=2, if CRI_m1=CRI_s1, CRI_m2=CRI_s2, RI_m1=RI_s1, and RI_m2=RI_s2, then SI=1, i.e., the RI, the PMI, and the CQI in MTRP are all shared into the STRP. As shown in Table 9, the CSI reported by the UE side includes: [CRI_m1 CRI_m2], [RI_m1 RI_m2], [CQI_m1 CQI_m2], and [PMI_m1 PMI_m2] associated with the MTRP; CRI_s1 associated with the TRP 1; and CRI_s2 associated with the TRP 2. In other words, the UE does not report RI_s1, CQI_s1, and PMI_s1 associated with the TRP 1 and RI_s2, CQI_s2, and PMI_s2 associated with the TRP 2. The base station side shares the received CSI including [RI_m1 RI_m2], [CQI_m1 CQI_m2], and [PMI_m1 PMI_m2] associated with the MTRP into two pieces of CSI associated with the STRP.

Otherwise, no CSI is shared. As shown in Table 10, all CSI is reported.

In an embodiment, when X=2 and SI=1, the UE side may further configure a 1-bit cqishareenable (i.e., the second bit in the above embodiment) to indicate a wideband CQI and sub-band CQI sharing status, and configure a 1-bit pmishareenable (i.e., the third bit in the above embodiment) to indicate a wideband PMI and sub-band PMI sharing status.

When cqishareenable=0, it indicates that a wideband CQI is shared and no sub-band CQI is shared.

When cqishareenable=1, it indicates that both the wideband CQI and a sub-band CQI are shared.

When pmishareenable=0, it indicates that a wideband PMI is shared and no sub-band PMI is shared.

When pmishareenable=1, it indicates that both the wideband PMI and a sub-band PMI are shared.

In an embodiment, the UE side may determine according to the RIs whether to share the CSI. In this embodiment, X=2, and the UE side adds a 2-bit SI information field in the UCI to indicate the CSI sharing status.

When X=2, if RI_m1=RI_s1 and RI_m2=RI_s2, then SI=11, i.e., the RI, the PMI, and the CQI in MTRP are all shared into the STRP. As shown in Table 9, the CSI reported by the UE side includes: [CRI_m1 CRI_m2], [RI_m1 RI_m2], [CQI_m1 CQI_m2], and [PMI_m1 PMI_m2] associated with the MTRP; CRI_s1 associated with the TRP 1; and CRI_s2 associated with the TRP 2. In other words, the UE does not report RI_s1, CQI_s1, and PMI_s1 associated with the TRP 1, and RI_s2, CQI_s2, and PMI_s2 associated with the TRP 2. The base station side shares the received CSI including [RI_m1 RI_m2], [CQI_m1 CQI_m2], and [PMI_m1 PMI_m2] associated with the MTRP into two pieces of CSI associated with the STRP.

When X=2, if RI_m1 !=RI_s1 and RI_m2 !=RI_s2, then SI=00, i.e., none of the RI, the PMI, and the CQI in MTRP is shared into the STRP. i.e., no CSI is shared. As shown in Table 10, all CSI is reported.

When X=2, if RI_m1 !=RI_s1 and RI_m2=RI_s2, then SI=01, indicating that CSI of the TRP 2 is shared. As shown in Table 11, the CSI reported by the UE side includes: [CRI_m1 CRI_m2], [RI_m1 RI_m2], [CQI_m1 CQI_m2], and [PMI_m1 PMI_m2] associated with the MTRP; CRI_s1, RI_s1, CQI_s1, and PMI_s1 associated with the TRP 1; and CRI_s2 associated with the TRP 2. In other words, the UE does not need to report RI_s2, CQI_s2, and PMI_s2 associated with the TRP 2. The base station side shares the received CSI including RI_m2, CQI_m2, and PMI_m2 associated with the MTRP into CSI associated with the STRP 2.

When X=2, if RI_m1=RI_s1 and RI_m2 !=RI_s2, then SI=10, indicating that CSI of the TRP 1 is shared. As shown in Table 12, the CSI reported by the UE side includes: [CRI_m1 CRI_m2], [RI_m1 RI_m2], [CQI_m1 CQI_m2], and [PMI_m1 PMI_m2] associated with the MTRP; CRI_s2, RI_s2, CQI_s2, and PMI_s2 associated with the TRP 2; and CRI_s1 associated with the TRP 1. In other words, the UE does not need to report RI_s1, CQI_s1, and PMI_s1 associated with the TRP 1. The base station side shares the received CSI including RI_m1, CQI_m1, and PMI_m1 associated with the MTRP into CSI associated with the STRP 1.

TABLE 11

| | Part of CSI is shared | | | |
| | MTRP | | STRP | |
| CSI | TRP 1 | TRP 2 | TRP 1 | TRP 2 |
| --- | --- | --- | --- | --- |
| CRI | CRI_m1 | CRI_m2 | CRI_s1 | CRI_s2 |
| RI | RI_m1 | RI_m2 | RI_s1 | RI_m2 |
| CQI | CQI_m1 | CQI_m2 | CQI_s1 | CQI_m2 |
| PMI | PMI_m1 | PMI_m2 | PMI_s1 | PMI_m2 |

TABLE 12

| | Part of CSI is shared | | | |
| | MTRP | | STRP | |
| CSI | TRP 1 | TRP 2 | TRP 1 | TRP 2 |
| --- | --- | --- | --- | --- |
| CRI | CRI_m1 | CRI_m2 | CRI_s1 | CRI_s2 |
| RI | RI_m1 | RI_m2 | RI_m1 | RI_s2 |

TABLE 12-continued

| | Part of CSI is shared | | | |
| | MTRP | | STRP | |
| CSI | TRP 1 | TRP 2 | TRP 1 | TRP 2 |
| --- | --- | --- | --- | --- |
| CQI | CQI_m1 | CQI_m2 | CQI_m1 | CQI_s2 |
| PMI | PMI_m1 | PMI_m2 | PMI_m1 | PMI_s2 |

In an embodiment, the UE side may determine according to the CRIs and the RIs whether to share the CSI. In this embodiment, the UE side adds a 2-bit SI information field in the UCI to indicate the CSI sharing status.

When X=2, if CRI_m1=CRI_s1 and CRI_m2=CRI_s2, the UE performs a CSI sharing operation according to RI_m1, RI_s1, RI_m2, and RI_s2.

Otherwise, no CSI is shared. As shown in Table 10, all CSI is reported.

In an embodiment, when X=2 and the 2-bit SI=01, the UE side may further configure a 1-bit cqishareenable (i.e., the second bit in the above embodiment) to indicate a wideband CQI and sub-band CQI sharing status, and configure a 1-bit pmishareenable (i.e., the third bit in the above embodiment) to indicate a wideband PMI and sub-band PMI sharing status.

When cqishareenable=0, it indicates that a wideband CQI_m2 in the MTRP is shared into the STRP 2, and no sub-band CQI in the MTRP is shared.

When cqishareenable=1, it indicates that both the wideband CQI_m2 and a sub-band CQI_m2 in the MTRP are shared into the STRP 2.

When pmishareenable=0, it indicates that a wideband PMI_m2 in the MTRP is shared into the STRP 2, and no sub-band PMI in the MTRP is shared.

When pmishareenable=1, it indicates that both the wideband PMI_m2 and a sub-band PMI_m2 in the MTRP are shared into the STRP 2.

In an embodiment, when X=2 and the 2-bit SI=10, the UE side may further configure a 1-bit cqishareenable (i.e., the second bit in the above embodiment) to indicate a wideband CQI and sub-band CQI sharing status, and configure a 1-bit pmishareenable (i.e., the third bit in the above embodiment) to indicate a wideband PMI and sub-band PMI sharing status.

When cqishareenable=0, it indicates that a wideband CQI_m1 in the MTRP is shared into the STRP 1, and no sub-band CQI in the MTRP is shared.

When cqishareenable=1, it indicates that both the wideband CQI_m1 and a sub-band CQI_m1 in the MTRP are shared into the STRP 1.

When pmishareenable=0, it indicates that a wideband PMI_m1 in the MTRP is shared into the STRP 1, and no sub-band PMI in the MTRP is shared.

When pmishareenable=1, it indicates that both the wideband PMI_m1 and a sub-band PMI_m1 in the MTRP are shared into the STRP 1.

In an embodiment, when X=2 and the 2-bit SI=11, the UE side may further configure a 1-bit cqishareenable (i.e., the second bit in the above embodiment) to indicate a wideband CQI and sub-band CQI sharing status, and configure a 1-bit pmishareenable (i.e., the third bit in the above embodiment) to indicate a wideband PMI and sub-band PMI sharing status.

When cqishareenable=0, it indicates that a wideband CQI_m1 in the MTRP is shared into the STRP 1, a wideband CQI_m2 in the MTRP is shared into the STRP 2, and no sub-band CQI in the MTRP is shared.

When cqishareenable=1, it indicates that both the wideband CQI_m1 and a sub-band CQI_m1 in the MTRP are shared into the STRP 1, and both the wideband CQI_m2 and a sub-band CQI_m2 in the MTRP are shared into the STRP 2.

When pmishareenable=0, it indicates that a wideband PMI_m1 in the MTRP is shared into the STRP 1, a wideband PMI_m2 in the MTRP is shared into the STRP 2, and no sub-band PMI in the MTRP is shared.

When pmishareenable=1, it indicates that both the wideband PMI_m1 and a sub-band PMI_m1 in the MTRP are shared into the STRP 1, and both the wideband PMI_m2 and a sub-band PMI_m2 in the MTRP are shared into the STRP 2.

In some embodiments, X=1, i.e., the UE side reports one piece of CSI associated with the MTRP and one piece of CSI associated with the STRP. The CSI associated with the MTRP includes [CRI_m1 CRI_m2]. [RI_m1 RI_m2], [CQI_m1 CQI_m2], and [PMI_m1 PMI_m2]. The CSI associated with the STRP includes CRI_s1. RI_s1, CQI_s1, and PMI_s1.

In an embodiment, the UE side may determine according to the RIs whether to share the CSI. In this embodiment, X=1, and the UE side adds a 1-bit SI information field in the UCI to indicate the CSI sharing status.

When X=1, if RI_m1 !=RI_s1, then SI=0. i.e., indicating that no CSI is shared. As shown in Table 13, all CSI is reported.

When X=1, if RI_m1=RI_s1, then SI=1, indicating that the CSI is shared. As shown in Table 14, the CSI reported by the UE side includes: [CRI_m1 CRI_m2], [RI_m1 RI_m2], [CQI_m1 CQI_m2], and [PMI_m1 PMI_m2] associated with the MTRP; and CRI_s1 associated with the TRP 1. In other words, the UE does not report RI_s1, CQI_s1, and PMI_s1 associated with the TRP 1. The base station side shares the received CSI including RI_m1, CQI_m1, and PMI_m1 associated with the MTRP into CSI associated with the STRP 1.

TABLE 13

| CSI is not shared | | | |
| --- | --- | --- | --- |
| | MTRP | | STRP |
| CSI | TRP 1 | TRP 2 | TRP 1 |
| CRI | CRI_m1 | CRI_m2 | CRI_s1 |
| RI | RI_m1 | RI_m2 | RI_s1 |
| CQI | CQI_m1 | CQI_m2 | CQI_s1 |
| PMI | PMI_m1 | PMI_m2 | PMI_s1 |

TABLE 14

| CSI is shared | | | |
| --- | --- | --- | --- |
| | MTRP | | STRP |
| CSI | TRP 1 | TRP 2 | TRP 1 |
| CRI | CRI_m1 | CRI_m2 | CRI_s1 |
| RI | RI_m1 | RI_m2 | RI_m1 |
| CQI | CQI_m1 | CQI_m2 | CQI_m1 |
| PMI | PMI_m1 | PMI_m2 | PMI_m1 |

In an embodiment, the UE side may determine according to the CRIs and the RIs whether to share the CSI. In this embodiment, the UE side adds a 1-bit SI information field in the UCI to indicate the CSI sharing status.

When X=1, if CRI_m1=CRI_s1, the UE side performs a CSI sharing operation according to RI_m1 and RI_s1.

Otherwise, no CSI is shared. As shown in Table 13, all CSI is reported.

In an embodiment, when X=1 and the 1-bit SI=1, the UE side may further configure a 1-bit cqishareenable (i.e., the second bit in the above embodiment) to indicate a wideband CQI and sub-band CQI sharing status, and configure a 1-bit pmishareenable (i.e., the third bit in the above embodiment) to indicate a wideband PMI and sub-band PMI sharing status.

When cqishareenable=0, it indicates that a wideband CQI is shared and no sub-band CQI is shared.

When cqishareenable=1, it indicates that both the wideband CQI and a sub-band CQI are shared.

When pmishareenable=0, it indicates that a wideband PMI is shared and no sub-band PMI is shared.

When pmishareenable=1, it indicates that both the wideband PMI and a sub-band PMI are shared.

In some embodiments, X=0, i.e., the UE side reports one piece of CSI associated with the MTRP. The CSI associated with the MTRP includes [CRI_m1 CRI_m2], [RI_m1 RI_m2], [CQI_m1 CQI_m2], and [PMI_m1 PMI_m2]. The UE side does not report the CSI associated with the STRP.

When X=0, the UE side may determine according to the RIs whether to share the CSI. In this embodiment, the UE side adds a 1-bit SI information field in the UCI to indicate the CSI sharing status.

When X=0, if RI_m1 !=RI_s1 or RI_m2 !=RI_s2, then SI=0, i.e., indicating that no CSI is shared. As shown in Table 15, the base station side cannot obtain CSI associated with the STRP.

When X=0, if RI_m1=RI_s1 and RI_m2=RI_s2, then SI=1, indicating that the CSI is shared. As shown in Table 16, the CSI reported by the UE side includes: [CRI_m1 CRI_m2], [RI_m1 RI_m2], [CQI_m1 CQI_m2], and [PMI_m1 PMI_m2] associated with the MTRP. In other words, the UE does not report CRI_s1. RI_s1, CQI_s1, and PMI_s1 associated with the TRP 1, and CRI_s2, RI_s2, CQI_s2, and PMI_s2 associated with the TRP 2. The base station side shares the received CSI including [CRI_m1 CRI_m2], [RI_m1 RI_m2], [CQI_m1 CQI_m2], and [PMI_m1 PMI_m2] associated with the MTRP into two pieces of CSI associated with the STRP.

TABLE 15

| CSI is not shared | | |
| --- | --- | --- |
| | MTRP | |
| CSI | TRP 1 | TRP 2 |
| CRI | CRI_m1 | CRI_m2 |
| RI | RI_m1 | RI_m2 |
| CQI | CQI_m1 | CQI_m2 |
| PMI | PMI_m1 | PMI_m2 |

TABLE 16

| CSI is shared | | | | |
| --- | --- | --- | --- | --- |
| | MTRP | | STRP | |
| CSI | TRP 1 | TRP 2 | TRP 1 | TRP 2 |
| CRI | CRI_m1 | CRI_m2 | CRI_m1 | CRI_m2 |
| RI | RI_m1 | RI_m2 | RI_m1 | RI_m2 |

TABLE 16-continued

| CSI is shared | | | | |
| --- | --- | --- | --- | --- |
| | MTRP | | STRP | |
| CSI | TRP 1 | TRP 2 | TRP 1 | TRP 2 |
| CQI | CQI_m1 | CQI_m2 | CQI_m1 | CQI_m2 |
| PMI | PMI_m1 | PMI_m2 | PMI_m1 | PMI_m2 |

In an embodiment, the UE side may determine according to the CRIs and the RIs whether to share the CSI. In this embodiment, the UE side adds a 1-bit SI information field in the UCI to indicate the CSI sharing status.

When X=0, if CRI_m1=CRI_s1 and CRI_m2=CRI_s2, the UE side performs a CSI sharing operation according to RI_m1 and RI_s1.

Otherwise, no CSI is shared, and the base station side cannot obtain the CSI associated with the STRP.

In an embodiment, FIG. 4 is a structural block diagram of a data transmission apparatus according to an embodiment of the present disclosure, which is applied to a data transmission device. The data transmission device may be a first communication node. As shown in FIG. 4, the data transmission apparatus in this embodiment includes a first pre-configuration module 410 and a transmitter 420.

The first pre-configuration module 410 is configured for preconfiguring a CSI reporting policy and an information field of DCI, where the CSI reporting policy includes a second communication node reporting one piece of CSI associated with an MTRP and X pieces of CSI associated with an STRP, and the information field of the DCI includes a first bit used for indicating a CSI sharing status, where X includes 0, 1, and 2.

The transmitter 420 is configured for sending the CSI reporting policy and the DCI to the second communication node, such that the second communication node performs CSI reporting according to the CSI reporting policy and perform CSI sharing according to the information field of the DCI.

In an embodiment, when X is 2 and one bit in the information field of the DCI is used to indicate the CSI sharing status, preconfiguring a CSI reporting policy and an information field of DCI includes:

when the first bit is a first value, preconfiguring the second communication node to report all CSI; or when the first bit is a second value, preconfiguring the second communication node to report the CSI associated with the MTRP and the CRI associated with the STRP, and preconfiguring the first communication node to share an RI, a CQI, and a PMI associated with the MTRP into the CSI associated with the STRP.

In an embodiment, when the first bit is the second value, the information field of the DCI further includes a second bit used for indicating a CQI sharing status and a third bit used for indicating a PMI sharing status;

when the second bit is the first value, the first communication node is pre-configured to share a wideband CQI and share no sub-band CQI; and when the second bit is the second value, the first communication node is pre-configured to share both the wideband CQI and a sub-band CQI; and when the third bit is the first value, the first communication node is pre-configured to share a wideband PMI and share no sub-band PMI; and when the third bit is the second value, the first communication node is pre-configured to share both the wideband PMI and a sub-band PMI.

In an embodiment, when X is 2 and two bits in the information field of the DCI are used to indicate the CSI sharing status, preconfiguring a CSI reporting policy and an information field of DCI includes:

when the first bit is a third value, preconfiguring the second communication node to report all CSI;

when the first bit is a fourth value, preconfiguring the second communication node to report the CSI associated with the MTRP and the CRI associated with the STRP, and preconfiguring the first communication node to share an RI, a CQI, and a PMI associated with the MTRP into the CSI associated with the STRP;

when the first bit is a fifth value, preconfiguring the second communication node to report the CSI associated with the MTRP, CSI associated with a first TRP in the STRP, and CRI associated with a second TRP in the STRP, and pre-configuring the first communication node to share an RI, a CQI, and a PMI associated with a second TRP in the MTRP into CSI associated with the second TRP in the STRP; or when the first bit is a sixth value, preconfiguring the second communication node to report the CSI associated with the MTRP, CSI associated with a second TRP in the STRP, and CRI associated with a first TRP in the STRP, and pre-configuring the first communication node to share an RI, a CQI, and a PMI associated with a first TRP in the MTRP into CSI associated with the first TRP in the STRP.

In an embodiment, when the first bit is the fourth value, the information field of the DCI further includes a second bit used for indicating a CQI sharing status and a third bit used for indicating a PMI sharing status;

when the second bit is the first value, the first communication node is pre-configured to share a first wideband CQI in the MTRP into the first TRP in the STRP and share a second wideband CQI in the MTRP into the second TRP in the STRP;

when the second bit is the second value, the first communication node is pre-configured to share both the first wideband CQI and a first sub-band CQI in the MTRP into the first TRP in the STRP and share both the second wideband CQI and a second sub-band CQI in the MTRP into the second TRP in the STRP;

when the third bit is the first value, the first communication node is pre-configured to share a first wideband PMI in the MTRP into the first TRP in the STRP and share a second wideband PMI in the MTRP into the second TRP in the STRP; and when the third bit is the second value, the first communication node is pre-configured to share both the first wideband PMI and a first sub-band PMI in the MTRP into the first TRP in the STRP and share both the second wideband PMI and a second sub-band PMI in the MTRP into the second TRP in the STRP.

In an embodiment, when the first bit is the fifth value, the information field of the DCI further includes a second bit used for indicating a CQI sharing status and a third bit used for indicating a PMI sharing status;

when the second bit is the first value, the first communication node is pre-configured to share a second wideband CQI in the MTRP into the second TRP in the STRP;

when the second bit is the second value, the first communication node is pre-configured to share both the second wideband CQI and a second sub-band CQI in the MTRP into the second TRP in the STRP;

when the third bit is the first value, the first communication node is pre-configured to share a second wideband PMI in the MTRP into the second TRP in the STRP; and when the third bit is the second value, the first communication node is pre-configured to share both the second wideband PMI and a second sub-band PMI in the MTRP into the second TRP in the STRP.

In an embodiment, when the first bit is the sixth value, the information field of the DCI further includes a second bit used for indicating a CQI sharing status and a third bit used for indicating a PMI sharing status;

when the second bit is the first value, the first communication node is pre-configured to share a first wideband CQI in the MTRP into the first TRP in the STRP;

when the second bit is the second value, the first communication node is pre-configured to share both the first wideband CQI and a first sub-band CQI in the MTRP into the first TRP in the STRP;

when the third bit is the first value, the first communication node is pre-configured to share a first wideband PMI in the MTRP into the first TRP in the STRP; and when the third bit is the second value, the first communication node is pre-configured to share both the first wideband PMI and a first sub-band PMI in the MTRP into the first TRP in the STRP.

In an embodiment, when X is 1 and one bit in the information field of the DCI is used to indicate the CSI sharing status, preconfiguring a CSI reporting policy and an information field of DCI includes:

when the first bit is a first value, preconfiguring the second communication node to report all CSI; or when the first bit is a second value, preconfiguring the second communication node to report the CSI associated with the MTRP and a CRI associated with a first TRP in the STRP, and preconfiguring the first communication node to share an RI, a CQI, and a PMI associated with a first TRP in the MTRP into the CSI associated with the first TRP in the STRP.

In an embodiment, when the first bit is the second value, the information field of the DCI further includes a second bit used for indicating a CQI sharing status and a third bit used for indicating a PMI sharing status;

when the second bit is the first value, the first communication node is pre-configured to share a wideband CQI and share no sub-band CQI; and when the second bit is the second value, the first communication node is pre-configured to share both the wideband CQI and a sub-band CQI; and when the third bit is the first value, the first communication node is pre-configured to share a wideband PMI and share no sub-band PMI; and when the third bit is the second value, the first communication node is pre-configured to share both the wideband PMI and a sub-band PMI.

In an embodiment, when X is 0 and one bit in the information field of the DCI is used to indicate the CSI sharing status, preconfiguring a CSI reporting policy and an information field of DCI includes:

when the first bit is a first value, preconfiguring the second communication node to report all CSI; or when the first bit is a second value, preconfiguring the second communication node to report the CSI associated with the MTRP, and pre-configuring the first communication node to share CSI associated with a first TRP in the MTRP into CSI associated with a first TRP in the STRP and share CSI associated with a second TRP in the MTRP into CSI associated with a second TRP in the STRP.

The data transmission apparatus provided in this embodiment is configured for implementing the data transmission method of the embodiment shown in FIG. 2. Implementation principles and technical effects of the data transmission apparatus provided in this embodiment are similar to those of the data transmission method of the embodiment shown in FIG. 2, so the details will not be repeated here.

Figure 5:
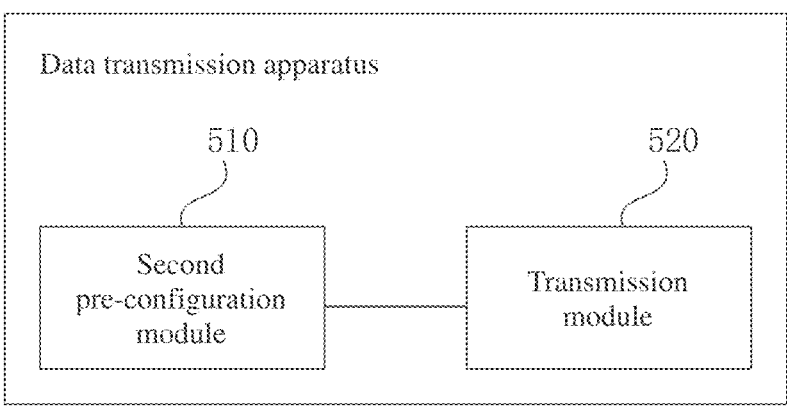
FIG. 5 is a structural block diagram of another data transmission apparatus according to an embodiment of the present disclosure.

In an embodiment, FIG. 5 is a structural block diagram of another data transmission apparatus according to an embodiment of the present disclosure. This embodiment is applied to a data transmission device. The data transmission device may be a second communication node. As shown in FIG. 5, the data transmission apparatus in this embodiment includes a second pre-configuration module 510 and a transmission module 520.

The second pre-configuration module 510 is configured for preconfiguring a CSI reporting policy and an SI information field in UCI, where the CSI reporting policy includes a second communication node reporting one piece of CSI associated with an MTRP and X pieces of CSI associated with an STRP, and the SI information field is used for indicating a CSI sharing status, where X includes 0, 1, and 2.

The transmission module 520 is configured for performing CSI reporting according to the CSI reporting policy and performing CSI sharing according to the SI information field.

In an embodiment, when X is 2 and one bit in the SI information field is used to indicate the CSI sharing status, preconfiguring a CSI reporting policy and an SI information field in UCI includes:

when the SI information field is a first value, preconfiguring the second communication node to report all CSI; or when the SI information field is a second value, preconfiguring the second communication node to report the CSI associated with the MTRP and the CRI associated with the STRP, and preconfiguring the first communication node to share an RI, a CQI, and a PMI associated with the MTRP into the CSI associated with the STRP.

In an embodiment, when the SI information field is the second value, the information field of the UCI further includes a second bit used for indicating a CQI sharing status and a third bit used for indicating a PMI sharing status;

when the second bit is the first value, the first communication node is pre-configured to share a wideband CQI and share no sub-band CQI; and when the second bit is the second value, the first communication node is pre-configured to share both the wideband CQI and a sub-band CQI; and when the third bit is the first value, the first communication node is pre-configured to share a wideband PMI and share no sub-band PMI; and when the third bit is the second value, the first communication node is pre-configured to share both the wideband PMI and a sub-band PMI.

In an embodiment, when X is 2 and two bits in the SI information field are used to indicate the CSI sharing status, preconfiguring a CSI reporting policy and an SI information field in UCI includes:

when the SI information field is a third value, preconfiguring the second communication node to report all CSI;

when the SI information field is a fourth value, precon-figuring the second communication node to report the CSI associated with the MTRP and the CRI associated with the STRP, and preconfiguring the first communi-cation node to share an RI, a CQI, and a PMI associated with the MTRP into the CSI associated with the STRP;

when the SI information field is a fifth value, preconfig-uring the second communication node to report the CSI associated with the MTRP, CSI associated with a first TRP in the STRP, and CRI associated with a second TRP in the STRP, and pre-configuring the first com-munication node to share an RI, a CQI, and a PMI associated with a second TRP in the MTRP into CSI associated with the second TRP in the STRP; or when the SI information field is a sixth value, preconfig-uring the second communication node to report the CSI associated with the MTRP, CSI associated with a second TRP in the STRP, and CRI associated with a first TRP in the STRP, and pre-configuring the first communication node to share an RI, a CQI, and a PMI associated with a first TRP in the MTRP into CSI associated with the first TRP in the STRP.

In an embodiment, when the SI information field is the fourth value, the information field of the UCI further includes a second bit used for indicating a CQI sharing status and a third bit used for indicating a PMI sharing status; when the second bit is the first value, the first communication node is pre-configured to share a first wideband CQI in the MTRP into the first TRP in the STRP and share a second wideband CQI in the MTRP into the second TRP in the STRP;

when the second bit is the second value, the first com-munication node is pre-configured to share both the first wideband CQI and a first sub-band CQI in the MTRP into the first TRP in the STRP and share both the second wideband CQI and a second sub-band CQI in the MTRP into the second TRP in the STRP;

when the third bit is the first value, the first communica-tion node is pre-configured to share a first wideband PMI in the MTRP into the first TRP in the STRP and share a second wideband PMI in the MTRP into the second TRP in the STRP; and when the third bit is the second value, the first commu-nication node is pre-configured to share both the first wideband PMI and a first sub-band PMI in the MTRP into the first TRP in the STRP and share both the second wideband PMI and a second sub-band PMI in the MTRP into the second TRP in the STRP.

In an embodiment, when the SI information field is the fifth value, the information field of the UCI further includes a second bit used for indicating a CQI sharing status and a third bit used for indicating a PMI sharing status;

when the second bit is the first value, the first communi-cation node is pre-configured to share a second wide-band CQI in the MTRP into the second TRP in the STRP;

when the second bit is the second value, the first com-munication node is pre-configured to share both the second wideband CQI and a second sub-band CQI in the MTRP into the second TRP in the STRP;

when the third bit is the first value, the first communica-tion node is pre-configured to share a second wideband PMI in the MTRP into the second TRP in the STRP; and when the third bit is the second value, the first commu-nication node is pre-configured to share both the second wideband PMI and a second sub-band PMI in the MTRP into the second TRP in the STRP.

In an embodiment, when the SI information field is the sixth value, the information field of the UCI further includes a second bit used for indicating a CQI sharing status and a third bit used for indicating a PMI sharing status;

when the second bit is the first value, the first communi-cation node is pre-configured to share a first wideband CQI in the MTRP into the first TRP in the STRP;

when the second bit is the second value, the first com-munication node is pre-configured to share both the first wideband CQI and a first sub-band CQI in the MTRP into the first TRP in the STRP;

when the third bit is the first value, the first communica-tion node is pre-configured to share a first wideband PMI in the MTRP into the first TRP in the STRP; and when the third bit is the second value, the first commu-nication node is pre-configured to share both the first wideband PMI and a first sub-band PMI in the MTRP into the first TRP in the STRP.

In an embodiment, when X is 1 and one bit in the SI information field is used to indicate the CSI sharing status, preconfiguring a CSI reporting policy and an SI information field in UCI includes:

when the SI information field is a first value, preconfig-uring the second communication node to report all CSI; or when the SI information field is a second value, precon-figuring the second communication node to report the CSI associated with the MTRP and a CRI associated with a first TRP in the STRP, and preconfiguring the first communication node to share an RI, a CQI, and a PMI associated with a first TRP in the MTRP into the CSI associated with the first TRP in the STRP.

In an embodiment, when the SI information field is the second value, the information field of the UCI further includes a second bit used for indicating a CQI sharing status and a third bit used for indicating a PMI sharing status;

when the second bit is the first value, the first communi-cation node is pre-configured to share a wideband CQI and share no sub-band CQI; and when the second bit is the second value, the first communication node is pre-configured to share both the wideband CQI and a sub-band CQI; and when the third bit is the first value, the first communica-tion node is pre-configured to share a wideband PMI and share no sub-band PMI; and when the third bit is the second value, the first communication node is pre-configured to share both the wideband PMI and a sub-band PMI.

In an embodiment, when X is 0 and one bit in the SI information field is used to indicate the CSI sharing status, preconfiguring a CSI reporting policy and an SI information field in UCI includes:

when the SI information field is a first value, preconfig-uring the second communication node to report all CSI; or when the SI information field is a second value, precon-figuring the second communication node to report the CSI associated with the MTRP, and pre-configuring the first communication node to share CSI associated with a first TRP in the MTRP into CSI associated with a first TRP in the STRP and share CSI associated with a second TRP in the MTRP into CSI associated with a second TRP in the STRP.

In an embodiment, the SI information field is determined in one of the following manners: determined by an RI of the MTRP and an RI of the STRP; or determined by a CRI of the MTRP, the RI of the MTRP, a CRI of the STRP, and the RI of the STRP.

The data transmission apparatus provided in this embodiment is configured for implementing the data transmission method of the embodiment shown in FIG. 3. Implementation principles and technical effects of the data transmission apparatus provided in this embodiment are similar to those of the data transmission method of the embodiment shown in FIG. 3, so the details will not be repeated here.

Figure 6:
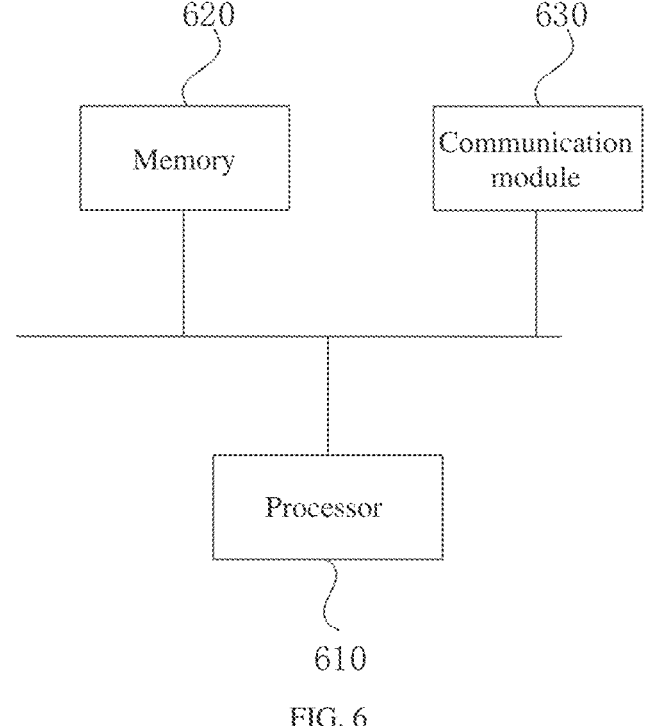
FIG. 6 is a schematic structural diagram of a data transmission device according to an embodiment of the present disclosure.

FIG. 6 is a schematic structural diagram of a data transmission device according to an embodiment of the present disclosure. As shown in FIG. 6, the device provided by the present disclosure includes a processor 610, a memory 620, and a communication module 630. The device may include one or more processors 610. In FIG. 6, one processor 610 is used as an example. The device may include one or more memories 620. In FIG. 6, one memory 620 is used as an example. The processor 610, the memory 620, and the communication module 630 in the device may be connected by a bus or in other ways. Connection by a bus is used as an example in FIG. 6. In this embodiment, the device may be a first communication node (for example, on a base station side).

The memory 620, as a computer-readable storage medium, may be configured for storing a software program, a computer-executable program, and modules, for example, program instructions/modules corresponding to the device according to any embodiment of the present disclosure (for example, the first pre-configuration module 410 and the transmitter 420 in the data transmission apparatus). The memory 620 may include a program storage area and a data storage area. The program storage area may store an operating system, and an application required by at least one function. The data storage area may store data created according to the use of the device and the like. In addition, the memory 620 may include a high-speed random access memory, and may also include a nonvolatile memory, e.g., at least one magnetic disk storage device, flash memory device, or other nonvolatile solid-state storage device. In some examples, the memory 620 may further include memories located remotely from the processor 610, and the remote memories may be connected to the device via a network. Examples of the network include, but not limited to, the Internet, an intranet, a local area network, a mobile communication network, and combinations thereof.

The communication module 630 is configured for performing communication interaction between a first communication node and a second communication node.

When the data transmission device is a first communication node, the device provided above may be configured for executing the data transmission method applied to a first communication node according to any one of the above embodiments, and has corresponding functions and effects.

When the data transmission device is a second communication node, the device provided above may be configured for executing the data transmission method applied to a second communication node according to any one of the above embodiments, and has corresponding functions and effects.

An embodiment of the present disclosure further provides a storage medium, containing a computer-executable instruction which, when executed by a processor of a computer, causes the processor to implement a data transmission method applied to a first communication node. The method includes: preconfiguring a CSI reporting policy and an information field of DCI, where the CSI reporting policy includes a second communication node reporting one piece of CSI associated with an MTRP and X pieces of CSI associated with an MTRP, and the information field of the DCI includes a first bit used for indicating a CSI sharing status, where X includes 0, 1, and 2; and sending the CSI reporting policy and the DCI to the second communication node, such that the second communication node performs CSI reporting according to the CSI reporting policy and performs CSI sharing according to the information field of the DCI.

An embodiment of the present disclosure further provides a storage medium, containing a computer-executable instruction which, when executed by a processor of a computer, causes the processor to implement a data transmission method applied to a second communication node. The method includes: preconfiguring a CSI reporting policy and an SI information field in UCI, where the CSI reporting policy includes a second communication node reporting one piece of CSI associated with an MTRP and X pieces of CSI associated with an STRP, and the SI information field is used for indicating a CSI sharing status, where X includes 0, 1, and 2; and performing CSI reporting according to the CSI reporting policy and performing CSI sharing according to the SI information field.

As will be understood by those having ordinary skills in the art, the term "user equipment" encompasses any suitable type of wireless user devices, such as a mobile telephone, a portable data processing device, a portable web browser or a vehicle-mounted mobile station.

In general, the various embodiments of the present disclosure may be implemented in hardware or special purpose circuits, software, logic, or any combination thereof. For example, some aspects may be implemented in hardware, while other aspects may be implemented in firmware or software that can be executed by a controller, a microprocessor or other computing device, and the present disclosure is not limited thereto.

The embodiments of the present disclosure may be implemented by the execution of computer program instructions by a data processor of a mobile device, for example, in a processor entity, or by hardware, or by a combination of software and hardware. The computer program instructions may be assembly instructions, Instruction Set Architecture (ISA) instructions, machine instructions, machine dependent instructions, microcode, firmware instructions, state setting data, or source code or object code written in any combination of one or more programming languages.

The block diagram of any logic flow in the accompanying drawings of the present disclosure may represent program steps, or may represent interconnected logic circuits, modules and functions, or may represent a combination of program steps and logic circuits, modules and functions. The computer program may be stored in a memory. The memory may be of any type suitable for the local technical environment and may be implemented using any suitable data storage technology, such as, but not limited to, a Read-Only Memory (ROM), a Random Access Memory (RAM), and optical storage devices and systems (a Digital Video Disc (DVD) or a Compact Disk (CD)), etc. The computer-readable medium may include a non-transitory storage medium. The data processor may be of any type suitable for the local technical environment, such as, but not limited to, a general purpose computer, a special purpose computer, a microprocessor, a Digital Signal Processor (DSP), an Application Specific Integrated Circuit (ASIC), a programmable logic device (Field-Programmable Gate Array (FPGA)), and a processor based on a multi-core processor architecture.

The above description is only some embodiments of the present disclosure, and is not intended to limit the present disclosure. To those having ordinary skills in the art, various modifications and variations may be made to the present disclosure. Any modifications, equivalent replacements, and improvements made within the principle of the present disclosure shall fall within the scope of the present disclosure.

What is claimed is:

1. A data transmission method, applied to a first communication node, the method comprising:

preconfiguring a channel state information (CSI) reporting policy and an information field of downlink control information (DCI), wherein the CSI reporting policy comprises reporting, by a second communication node, one piece of CSI associated with a Multi Transmission Receiving Point (MTRP) and X pieces of CSI associated with a Single Transmission Receiving Point (STRP), and the information field of the DCI comprises a first bit used for indicating a CSI sharing status, wherein X comprises 0, 1, and 2; and sending the CSI reporting policy and the DCI to the second communication node, wherein the second communication node performs CSI reporting according to the CSI reporting policy and performs CSI sharing according to the information field of the DCI.

2. The method of claim 1, wherein in response to X being 2 and one bit in the information field of the DCI being used to indicate the CSI sharing status, preconfiguring a CSI reporting policy and an information field of DCI comprises:

in response to the first bit being a first value, preconfiguring the second communication node to report all CSI; or in response to the first bit being a second value, preconfiguring the second communication node to report the CSI associated with the MTRP and the CRI associated with the STRP, and preconfiguring the first communication node to share a Rank Indicator (RI), a Channel Quality Indicator (CQI), and a Precoding Matrix Indicator (PMI) associated with the MTRP into the CSI associated with the STRP.

3. The method of claim 2, wherein in response to the first bit being the second value, the information field of the DCI further comprises a second bit used for indicating a CQI sharing status and a third bit used for indicating a PMI sharing status;

in response to the second bit being the first value, preconfiguring the first communication node to share a wideband CQI and share no sub-band CQI; and in response to the second bit being the second value, pre-configuring the first communication node to share both the wideband CQI and the sub-band CQI;

in response to the third bit being the first value, preconfiguring the first communication node to share a wideband PMI and share no sub-band PMI; and in response to the third bit being the second value, preconfiguring the first communication node to share both the wideband PMI and the sub-band PMI.

4. The method of claim 1, wherein in response to X being 2 and two bits in the information field of the DCI being used to indicate the CSI sharing status, preconfiguring a CSI reporting policy and an information field of DCI comprises:

in response to the first bit being a third value, preconfiguring the second communication node to report all CSI;

in response to the first bit being a fourth value, preconfiguring the second communication node to report the CSI associated with the MTRP and the CRI associated with the STRP, and preconfiguring the first communication node to share an RI, a CQI, and a PMI associated with the MTRP into the CSI associated with the STRP;

in response to the first bit being a fifth value, preconfiguring the second communication node to report the CSI associated with the MTRP, CSI associated with a first TRP in the STRP, and CRI associated with a second TRP in the STRP, and pre-configuring the first communication node to share an RI, a CQI, and a PMI associated with a second TRP in the MTRP into CSI associated with the second TRP in the STRP; or in response to the first bit being a sixth value, preconfiguring the second communication node to report the CSI associated with the MTRP, CSI associated with a second TRP in the STRP, and CRI associated with a first TRP in the STRP, and pre-configuring the first communication node to share an RI, a CQI, and a PMI associated with a first TRP in the MTRP into CSI associated with the first TRP in the STRP.

5. The method of claim 4, wherein in response to the first bit being the fourth value, the information field of the DCI further comprises a second bit used for indicating a CQI sharing status and a third bit used for indicating a PMI sharing status;

in response to the second bit being the first value, preconfiguring the first communication node to share a first wideband CQI in the MTRP into the first TRP in the STRP and share a second wideband CQI in the MTRP into the second TRP in the STRP;

in response to the second bit being the second value, pre-configuring the first communication node to share both the first wideband CQI and a first sub-band CQI in the MTRP into the first TRP in the STRP and share both the second wideband CQI and a second sub-band CQI in the MTRP into the second TRP in the STRP;

in response to the third bit being the first value, preconfiguring the first communication node to share a first wideband PMI in the MTRP into the first TRP in the STRP and share a second wideband PMI in the MTRP into the second TRP in the STRP; and in response to the third bit being the second value, pre-configuring the first communication node to share both the first wideband PMI and a first sub-band PMI in the MTRP into the first TRP in the STRP and share both the second wideband PMI and a second sub-band PMI in the MTRP into the second TRP in the STRP.

6. The method of claim 4, wherein in response to the first bit being the fifth value, the information field of the DCI further comprises a second bit used for indicating a CQI sharing status and a third bit used for indicating a PMI sharing status;

in response to the second bit being the first value, preconfiguring the first communication node to share a second wideband CQI in the MTRP into the second TRP in the STRP;

in response to the second bit being the second value, pre-configuring the first communication node to share both the second wideband CQI and a second sub-band CQI in the MTRP into the second TRP in the STRP;

in response to the third bit being the first value, preconfiguring the first communication node to share a second wideband PMI in the MTRP into the second TRP in the STRP; and in response to the third bit being the second value, pre-configuring the first communication node to share both the second wideband PMI and a second sub-band PMI in the MTRP into the second TRP in the STRP.

7. The method of claim 4, wherein in response to the first bit being the sixth value, the information field of the DCI further comprises a second bit used for indicating a CQI sharing status and a third bit used for indicating a PMI sharing status;

in response to the second bit being the first value, pre-configuring the first communication node to share a first wideband CQI in the MTRP into the first TRP in the STRP;

in response to the second bit being the second value, pre-configuring the first communication node to share both the first wideband CQI and a first sub-band CQI in the MTRP into the first TRP in the STRP;

in response to the third bit being the first value, pre-configuring the first communication node to share a first wideband PMI in the MTRP into the first TRP in the STRP; and in response to the third bit being the second value, pre-configuring the first communication node to share both the first wideband PMI and a first sub-band PMI in the MTRP into the first TRP in the STRP.

8. The method of claim 1, wherein in response to X being 1 and one bit in the information field of the DCI being used to indicate the CSI sharing status, preconfiguring a CSI reporting policy and an information field of DCI comprises:

in response to the first bit being a first value, preconfiguring the second communication node to report all CSI; or in response to the first bit being a second value, preconfiguring the second communication node to report the CSI associated with the MTRP and a CRI associated with a first TRP in the STRP, and preconfiguring the first communication node to share a Rank Indicator (RI), a Channel Quality Indicator (CQI), and a Precoding Matrix Indicator (PMI) associated with a first TRP in the MTRP into the CSI associated with the first TRP in the STRP.

9. The method of claim 8, wherein in response to the first bit being the second value, the information field of the DCI further comprises a second bit used for indicating a CQI sharing status and a third bit used for indicating a PMI sharing status;

in response to the second bit being the first value, pre-configuring the first communication node to share a wideband CQI and share no sub-band CQI; and in response to the second bit being the second value, pre-configuring the first communication node to share both the wideband CQI and the sub-band CQI; and in response to the third bit being the first value, pre-configuring the first communication node to share a wideband PMI and share no sub-band PMI; and in response to the third bit being the second value, pre-configuring the first communication node to share both the wideband PMI and the sub-band PMI.

10. The method of claim 1, wherein in response to X being 0 and one bit in the information field of the DCI being used to indicate the CSI sharing status, preconfiguring a CSI reporting policy and an information field of DCI comprises:

in response to the first bit being a first value, preconfiguring the second communication node to report all CSI; or in response to the first bit being a second value, preconfiguring the second communication node to report the CSI associated with the MTRP, and pre-configuring the first communication node to share CSI associated with a first TRP in the MTRP into CSI associated with a first TRP in the STRP and share CSI associated with a second TRP in the MTRP into CSI associated with a second TRP in the STRP.

11. A data transmission method, applied to a second communication node, the method comprising:

preconfiguring a Channel State Information (CSI) reporting policy and a Share Indication (SI) information field in Uplink Control Information (UCI), wherein the CSI reporting policy comprises reporting, by a second communication node, one piece of CSI associated with a Multi Transmission Receiving Point (MTRP) and X pieces of CSI associated with a Single Transmission Receiving Point (STRP), and the SI information field is used for indicating a CSI sharing status, wherein X comprises 0, 1, and 2; and performing CSI reporting according to the CSI reporting policy and performing CSI sharing according to the SI information field.

12. The method of claim 11, wherein in response to X being 2 and one bit in the SI information field being used to indicate the CSI sharing status, preconfiguring a CSI reporting policy and an SI information field in UCI comprises:

in response to the SI information field being a first value, preconfiguring the second communication node to report all CSI; or in response to the SI information field being a second value, preconfiguring the second communication node to report the CSI associated with the MTRP and the CRI associated with the STRP, and preconfiguring the first communication node to share a Rank Indicator (RI), a Channel Quality Indicator (CQI), and a Precoding Matrix Indicator (PMI) associated with the MTRP into the CSI associated with the STRP.

13. The method of claim 12, wherein in response to the SI information field being the second value, the information field of the UCI further comprises a second bit used for indicating a CQI sharing status and a third bit used for indicating a PMI sharing status;

in response to the second bit being the first value, pre-configuring the first communication node to share a wideband CQI and share no sub-band CQI; and in response to the second bit being the second value, pre-configuring the first communication node to share both the wideband CQI and the sub-band CQI;

in response to the third bit being the first value, pre-configuring the first communication node to share a wideband PMI and share no sub-band PMI; and in response to the third bit being the second value, pre-configuring the first communication node to share both the wideband PMI and the sub-band PMI.

14. The method of claim 12, wherein in response to X being 2 and two bits in the SI information field being used to indicate the CSI sharing status, preconfiguring a CSI reporting policy and an SI information field in UCI comprises:

in response to the SI information field being a third value, preconfiguring the second communication node to report all CSI;

in response to the SI information field being a fourth value, preconfiguring the second communication node to report the CSI associated with the MTRP and the CRI associated with the STRP, and preconfiguring the first communication node to share an RI, a CQI, and a PMI associated with the MTRP into the CSI associated with the STRP;

in response to the SI information field being a fifth value, preconfiguring the second communication node to report the CSI associated with the MTRP, CSI associated with a first TRP in the STRP, and CRI associated with a second TRP in the STRP, and pre-configuring the first communication node to share an RI, a CQI, and a PMI associated with a second TRP in the MTRP into CSI associated with the second TRP in the STRP; or in response to the SI information field being a sixth value, preconfiguring the second communication node to report the CSI associated with the MTRP, CSI associated with a second TRP in the STRP, and CRI associated with a first TRP in the STRP, and pre-configuring the first communication node to share an RI, a CQI, and a PMI associated with a first TRP in the MTRP into CSI associated with the first TRP in the STRP.

15. The method of claim 14, wherein in response to the SI information field being the fourth value, the information field of the UCI further comprises a second bit used for indicating a CQI sharing status and a third bit used for indicating a PMI sharing status; in response to the second bit being the first value, pre-configuring the first communication node to share a first wideband CQI in the MTRP into the first TRP in the STRP and share a second wideband CQI in the MTRP into the second TRP in the STRP;

in response to the second bit being the second value, pre-configuring the first communication node to share both the first wideband CQI and a first sub-band CQI in the MTRP into the first TRP in the STRP and share both the second wideband CQI and a second sub-band CQI in the MTRP into the second TRP in the STRP;

in response to the third bit being the first value, pre-configuring the first communication node to share a first wideband PMI in the MTRP into the first TRP in the STRP and share a second wideband PMI in the MTRP into the second TRP in the STRP; and in response to the third bit being the second value, pre-configuring the first communication node to share both the first wideband PMI and a first sub-band PMI in the MTRP into the first TRP in the STRP and share both the second wideband PMI and a second sub-band PMI in the MTRP into the second TRP in the STRP.

16. The method of claim 14, wherein in response to the SI information field being the fifth value, the information field of the UCI further comprises a second bit used for indicating a CQI sharing status and a third bit used for indicating a PMI sharing status;

in response to the second bit being the first value, pre-configuring the first communication node to share a second wideband CQI in the MTRP into the second TRP in the STRP;

in response to the second bit being the second value, pre-configuring the first communication node to share both the second wideband CQI and a second sub-band CQI in the MTRP into the second TRP in the STRP;

in response to the third bit being the first value, pre-configuring the first communication node to share a second wideband PMI in the MTRP into the second TRP in the STRP; and in response to the third bit being the second value, pre-configuring the first communication node to share both the second wideband PMI and a second sub-band PMI in the MTRP into the second TRP in the STRP.

17. The method of claim 14, wherein in response to the SI information field being the sixth value, the information field of the UCI further comprises a second bit used for indicating a CQI sharing status and a third bit used for indicating a PMI sharing status;

in response to the second bit being the first value, pre-configuring the first communication node to share a first wideband CQI in the MTRP into the first TRP in the STRP;

in response to the second bit being the second value, pre-configuring the first communication node to share both the first wideband CQI and a first sub-band CQI in the MTRP into the first TRP in the STRP;

in response to the third bit being the first value, pre-configuring the first communication node to share a first wideband PMI in the MTRP into the first TRP in the STRP; and in response to the third bit being the second value, pre-configuring the first communication node to share both the first wideband PMI and a first sub-band PMI in the MTRP into the first TRP in the STRP.

18. The method of claim 11, wherein in response to X being 1 and one bit in the SI information field being used to indicate the CSI sharing status, preconfiguring a CSI reporting policy and an SI information field in UCI comprises:

in response to the SI information field being a first value, preconfiguring the second communication node to report all CSI information; or in response to the SI information field being a second value, preconfiguring the second communication node to report the CSI associated with the MTRP and a CRI associated with a first TRP in the STRP, and preconfiguring the first communication node to share a Rank Indicator (RI), a Channel Quality Indicator (CQI), and a Precoding Matrix Indicator (PMI) associated with a first TRP in the MTRP into the CSI associated with the first TRP in the STRP.

19. The method of claim 11, wherein in response to the SI information field being the second value, the information field of the UCI further comprises a second bit used for indicating a CQI sharing status and a third bit used for indicating a PMI sharing status;

in response to the second bit being the first value, pre-configuring the first communication node to share a wideband CQI and share no sub-band CQI; and in response to the second bit being the second value, pre-configuring the first communication node to share both the wideband CQI and the sub-band CQI; and in response to the third bit being the first value, pre-configuring the first communication node to share a wideband PMI and share no sub-band PMI; and in response to the third bit being the second value, pre-configuring the first communication node to share both the wideband PMI and the sub-band PMI.

20. A non-transitory computer-readable storage medium, storing a computer program which, when executed by a processor, causes the processor to perform a data transmission method, applied to a first communication node, the method comprising:

preconfiguring a channel state information (CSI) reporting policy and an information field of downlink control information (DCI), wherein the CSI reporting policy comprises reporting, by a second communication node, one piece of CSI associated with a Multi Transmission Receiving Point (MTRP) and X pieces of CSI associated with a Single Transmission Receiving Point (STRP), and the information field of the DCI comprises a first bit used for indicating a CSI sharing status, wherein X comprises 0, 1, and 2; and sending the CSI reporting policy and the DCI to the second communication node, wherein the second communication node performs CSI reporting according to the CSI reporting policy and performs CSI sharing according to the information field of the DCI.

* * * * *